United States Patent
Hymel et al.

(10) Patent No.: US 9,294,718 B2
(45) Date of Patent: Mar. 22, 2016

(54) METHOD, SYSTEM AND APPARATUS FOR AUTOMATED ALERTS

(75) Inventors: James Allen Hymel, Kitchener (CA); Jonathan Andrew Evans, Waterloo (CA); Janine Mary Hodder, Waterloo (CA); Edvard Kikic, Kitchener (CA); Alec Reid Thomas, Toronto (CA)

(73) Assignee: BlackBerry Limited, Waterloo, Ontario (CA)

( * ) Notice: Subject to any disclaimer, the term of this patent is extended or adjusted under 35 U.S.C. 154(b) by 650 days.

(21) Appl. No.: 13/341,156

(22) Filed: Dec. 30, 2011

(65) Prior Publication Data

US 2013/0169778 A1 Jul. 4, 2013

(51) Int. Cl.
*H04N 7/18* (2006.01)
*H04N 7/14* (2006.01)
*G08B 13/08* (2006.01)

(52) U.S. Cl.
CPC ............... *H04N 7/147* (2013.01); *G08B 13/08* (2013.01)

(58) Field of Classification Search
None
See application file for complete search history.

(56) References Cited

U.S. PATENT DOCUMENTS

| | | | |
|---|---|---|---|
| 6,803,945 B1 | 10/2004 | Needham | |
| 7,466,844 B2 | 12/2008 | Ramaswamy et al. | |
| 7,643,056 B2 | 1/2010 | Silsby | |
| 7,692,684 B2 | 4/2010 | Ku et al. | |
| 7,787,656 B2 | 8/2010 | Chen | |
| 7,843,495 B2 | 11/2010 | Aas et al. | |
| 7,991,193 B2 | 8/2011 | Hampapur et al. | |
| 2003/0066875 A1 | 4/2003 | Rouet | |
| 2005/0201612 A1 | 9/2005 | Park et al. | |
| 2005/0261023 A1 | 11/2005 | Yang | |
| 2007/0177805 A1 | 8/2007 | Gallagher | |
| 2009/0100171 A1* | 4/2009 | Haynes et al. | 709/224 |
| 2010/0205667 A1* | 8/2010 | Anderson et al. | 726/19 |
| 2010/0210287 A1 | 8/2010 | De Vries et al. | |
| 2011/0179366 A1 | 7/2011 | Chae | |
| 2012/0297305 A1* | 11/2012 | Hehmeyer et al. | 715/733 |
| 2012/0327177 A1* | 12/2012 | Kee et al. | 348/14.08 |

FOREIGN PATENT DOCUMENTS

| | | |
|---|---|---|
| EP | 0582989 A2 | 2/1994 |
| WO | 2010078972 A2 | 7/2010 |
| WO | 2011109028 A1 | 9/2011 |
| WO | 2011161486 A1 | 12/2011 |

OTHER PUBLICATIONS

Extended European Search report mailed May 15, 2012, in corresponding European patent application No. 11196163.7.

(Continued)

*Primary Examiner* — Heather Jones
(74) *Attorney, Agent, or Firm* — Fish & Richardson P.C.

(57) ABSTRACT

A method, system and apparatus for automated alerts are provided. Communication, via a processor and communication interface of a communication device, occurs with one or more remote communication devices in a communication session. Data is received at the processor, from a camera device. In response, to the data, an alert is transmitted, via the communication interface, to the one or more remote communication devices in the communication session.

18 Claims, 19 Drawing Sheets

(56) References Cited

OTHER PUBLICATIONS

Color Wireless IP camera (Black, Night Vision + Motion Detection + Email Alert), http://www.lightinthebox.com/Color-Wireless-IP-camera--Black--Night-Vision-Motion- . . . , retrieved Oct. 24, 2011, pp. 1-6.

Webcam software, http://www.willingsoftware.com/help/Motion%20Detection.shtml, retrieved Oct. 24, 2011, pp. 1-4.

Geovision Email Alert Notification Setup, http://www.cctvcamerpors.com/Geovision-Email-Alert-Notification-s/202.htm, retrieved Oct. 24, 2011, pp. 1-3.

* cited by examiner

Fig. 9A — 901

| Chat List | |
|---|---|
| You | |
| Bob | |

903:
Bob: Hey
You: Hey
Bob: What's Up?
You: Not Much
ALERT: Warning! The number of people in the area around Bob has increased and privacy may be compromised. Watch what you say!
You: You alone?
Bob: Nope, my mom just came into my room.

| Chat List | |
|---|---|
| You | |
| Bob | |

903:
Bob: Hey
You: Hey
Bob: What's Up?
You: Not Much
ALERT: Warning, Bob's MOM has entered the room. Watch what you say!
You: Your mom there?
Bob: Yup, she just came in. How'd you know?
You: I don't know. Just got an alert.
Bob: Oh right, that's a neat feature.

| Chat List | |
|---|---|
| You | |
| Bob | |
| Mrs. Smith (ADD?) | 911 |

903:
Bob: Hey
You: Hey
Bob: What's Up?
You: Not Much
ALERT: See Chat List
You: Your mom there?
Bob: Yup, she just came in. How'd you know?
You: I don't know. Just got an alert.
Bob: Oh right, that's a neat feature. But DON'T ADD her dude!

905

METHOD, SYSTEM AND APPARATUS FOR AUTOMATED ALERTS

FIELD

The specification relates generally to communication devices, and specifically to a method, system and apparatus for automated alerts.

BACKGROUND

The evolution of computers is currently quite active in the mobile device environment. It is now well-known to including calendaring, contacts, and messaging functions in mobile devices. More recently, there has been a veritable explosion of the number and type of applications that are configured to the unique form factors and computing environments of mobile devices.

BRIEF DESCRIPTIONS OF THE DRAWINGS

For a better understanding of the various implementations described herein and to show more clearly how they may be carried into effect, reference will now be made, by way of example only, to the accompanying drawings in which:

FIGS. 9A-9C depict Graphic User Interfaces (GUI) rendered at the device of FIG. 3 after receiving an automated alert, according to non-limiting implementations.

DETAILED DESCRIPTION

Figure 1:
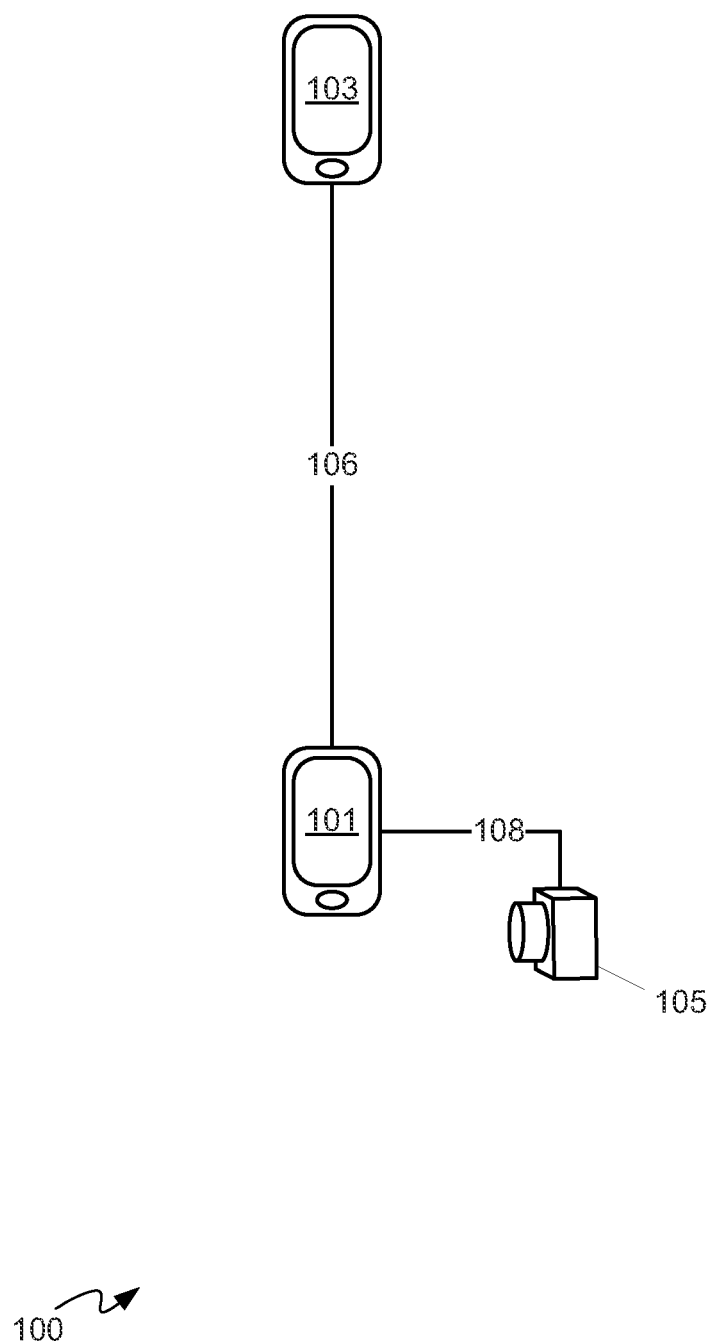
FIG. 1 depicts a system for automated alerts, according to non-limiting implementations.

An aspect of the specification provides a communication device comprising: a processor and a communication interface, the processor enabled to: communicate with one or more remote communication devices in a communication session via the communication interface; receive data from a camera device; and transmit an alert to the one or more remote communication devices in the communication session, the alert based on the data.

The processor can further be enabled to determine that at least a subset of the data meets a given condition, and the alert is based on the given condition.

The subset can include one or more of a change that has occurred in the data and a representation of a face.

The alert can be indicative of the given condition.

The communication device can further comprise the camera device. The camera device can be located at one or more of a front of the communication device and a rear of the communication device.

The camera device can be distinct from the communication device and the processor can be further enabled to communicate with the camera device via the communication interface.

The data can comprise images and the given condition can comprise a change in a number of people in the images.

The data can comprise images and the processor can be further enabled to analyse the images to determine one or more identifiers respectively associated with people in the images, wherein the alert comprises the one or more identifiers.

The alert can be indicative that the one or more remote communication devices should enter a privacy mode.

The processor can be further enabled to place the communication device into a privacy mode when the alert is transmitted.

The data can comprise images and the processor can be further enabled to communicate with the one or more remote communication devices in a video chat session, different from the communication session, via the communication interface, and wherein the images are acquired by the camera device in the video chat session.

The processor can be further enabled to render data associated with the alert at a display associated with the communication device.

The communication session can comprise one or more of a P2P session, text messages, SMS (short message service) messages, BBM™ (Blackberry Messenger) messages, and email messages.

Another aspect of the specification provides a method comprising: communicating, via a processor and communication interface of a communication device, with one or more remote communication devices in a communication session; receiving, at the processor, data from a camera device; and transmitting, via the communication interface, an alert to the one or more remote communication devices in the communication session, wherein transmitting the alert is based on the data.

The method can further comprise determining that at least a subset of the data meets a given condition, wherein the alert is based on the given condition.

Determining can comprise determining whether the subset comprises one or more of a change that has occurred in the data and a representation of a face.

Transmitting the alert can comprise transmitting an indication of the given condition.

The data can comprise images and the given condition can comprise a change in a number of people in the images.

The data can comprise images and the method further can comprise analysing the images to determine one or more identifiers respectively associated with people in the images, wherein the alert can comprise the one or more identifiers.

The alert can be indicative that the one or more remote communication devices should enter a privacy mode.

The method can further comprise placing the communication device into a privacy mode when the alert is transmitted.

The data can comprise images and the method can further comprise communicating with the one or more remote communication devices in a video chat session, different from the communication session, via the communication interface, and wherein the images are acquired by the camera device in the video chat session.

The method can further comprise rendering data associated with the alert at a display associated with the communication device.

The communication session can comprise one or more of a P2P session, text messages, SMS (short message service) messages, BBM™ (Blackberry Messenger) messages, and email messages.

A further aspect of the specification provides a computer program product, comprising a computer usable medium having a computer readable program code adapted to be executed to implement a method of: communicating, via a processor and communication interface of a communication device, with one or more remote communication devices in a communication session; receiving, at the processor, data from a camera device; and transmitting, via the communication interface, an alert to the one or more remote communication devices in the communication session, the alert based on the data. The computer program product can be a non-transitory computer program product.

FIG. 1 depicts a system 100 for automated alerts, according to non-limiting implementations. System 100 comprises a communication device 101 enabled to communicate with one or more remote communication devices 103 and a camera device 105 via respective links 106, 108. Communication devices 101 will be also referred to hereafter as device 101. This convention will be used elsewhere in the present specification. Camera device 105 will also be referred to hereafter as camera 105. While only one remote device 103 is depicted in system 100, it is appreciated that any suitable number of remote devices is within the scope of present implementations.

In example implementations, device 101 is generally enabled to communicate with device 103 in a peer-to-peer (P2P) session, including but not limited to text messages, SMS (short message service) messages, BBM™ (Blackberry Messenger) messages and the like. It is appreciated that text and/or audio can be exchanged in messages in P2P sessions. However, present implementations are not limited to P2P sessions. For example, as will be described below, any communication session is within the scope of present implementations, including but not limited to email exchanges.

Further, device 101 is enabled to receive an indication from device 105 that a change has occurred in data acquired by camera 105, and, in response, to the change comprising a given condition, transmit an alert of the change to device 103 in the P2P session. In some implementations, data acquired by camera 105 comprises images, while in other implementations, data acquired by camera 105 can comprise audio data.

For example, as will presently be explained, camera 105 can be positioned to acquire images of an area proximal device 101, and when the number of people in the images changes, an alert can be transmitted to device 103 which can then trigger device 103 to provide an indication of the change to warn a user of device 103 to, for example, watch what they say in the P2P session.

Device 101 can be any type of electronic device that can be used in a self-contained manner to engage in P2P sessions with device 103. It is hence appreciated that device 101 comprises any suitable communication device for communicating with device 103, and camera 105, including but not limited to any suitable combination of computing devices, personal computers, laptop computers, portable electronic devices, mobile computing device, portable computing devices, tablet computing devices, laptop computing devices, desktop phones, telephones, PDAs (personal digital assistants), cellphones, smartphones and the like. Other suitable communication devices are within the scope of present implementations.

Device 103 can be any type of electronic device that can be used in a self-contained manner to engage in P2P sessions with device 101. It is hence appreciated that device 103 comprises any suitable communication device for communicating with device 101, including but not limited to any suitable combination of computing devices, personal computers, laptop computers, portable electronic devices, mobile computing device, portable computing devices, tablet computing devices, laptop computing devices, desktop phones, telephones, PDAs (personal digital assistants), cellphones, smartphones and the like. Other suitable communication devices are within the scope of present implementations.

Camera 105 comprises any suitable camera device for acquiring images, and communicating with device 103, including, but not limited to, a CCD (charge coupled device), a digital camera, and a digital video camera. It is appreciated that, in some implementations, as will be presently described, camera 105 can be an element of a communication device similar to devices 101, 103.

Link 106 comprises any suitable combination of wired and/or wireless links, wired and/or wireless devices and/or wired and/or wireless networks, including but not limited to any suitable combination of USB (universal serial bus) cables, serial cables, wireless links, cell-phone links, cellular network links (including but not limited to 2G, 2.5G, 3G, 4G+, and the like) wireless data, Bluetooth links, NFC (near field communication) links, WiFi links, WiMax links, packet based links, the Internet, analog networks, the PSTN (public switched telephone network), access points, and the like, and/or a combination. It is appreciated that link 106 is generally enabled to carry a P2P session between devices 101, 103.

Link 108 comprises any suitable combination of wired and/or wireless links, wired and/or wireless devices and/or wired and/or wireless networks, including but not limited to any suitable combination of USB (universal serial bus) cables, serial cables, wireless links, cell-phone links, cellular network links (including but not limited to 2G, 2.5G, 3G, 4G+, and the like) wireless data, Bluetooth links, NFC (near field communication) links, WiFi links, WiMax links, packet based links, the Internet, analog networks, the PSTN (public switched telephone network), access points, and the like, and/or a combination. However, it is appreciated that, as camera 105 can be local to device 101, link 108 can comprise a local link between device 101 and camera 105.

Figure 2:
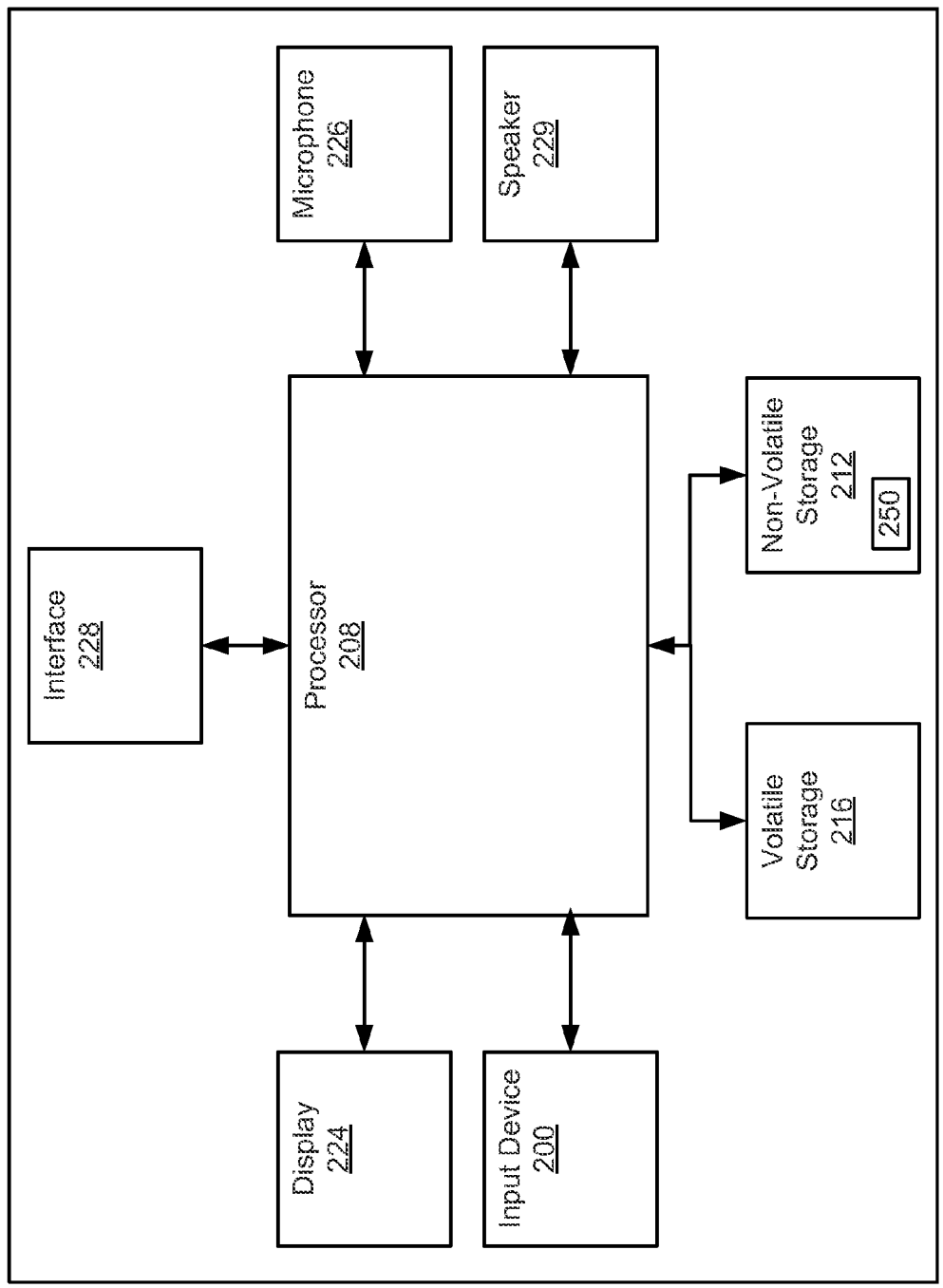
FIG. 2 depicts a device for providing automated alerts, according to non-limiting implementations.

Attention is directed to FIG. 2, which depicts a schematic diagram of device 101 according to non-limiting implementations. It should be emphasized that the structure in FIG. 2 is purely exemplary, and contemplates a device that can be used for both wireless voice (e.g. telephony) and wireless data communications (e.g. email, web browsing, text, and the like). Device 101 comprises at least one input device 200 generally enabled to receive input data, and can comprise any suitable combination of input devices, including but not limited to a keyboard, a keypad, a pointing device, a mouse, a track wheel, a trackball, a touchpad, a touch screen and the like. Other suitable input devices are within the scope of present implementations.

Input from input device 200 is received at processor 208 (which can be implemented as a plurality of processors). Processor 208 is configured to communicate with a non-volatile storage unit 212 (e.g. Erasable Electronic Programmable Read Only Memory ("EEPROM"), Flash Memory) and a volatile storage unit 216 (e.g. random access memory ("RAM")). Programming instructions that implement the functional teachings of device 101 as described herein are typically maintained, persistently, in non-volatile storage unit 212 and used by processor 208 which makes appropriate utilization of volatile storage 216 during the execution of such programming instructions. It is to be understood that the processor 208 can be further enabled to determine at least a subset of the data meets a given condition in data 250. Furthermore, it is to be understood that the alert can be based on the given condition. For example, the data 250 can include a subset of data corresponding to a given condition. In some embodiments, the subset of data can include data representing a portion of an image. For example, the portion of the image may include face. In embodiments the subset of data can include a change that has occurred in the data that meets the given condition. For example, the change can include a motion. Those skilled in the art will now recognize that non-volatile storage unit 212 and volatile storage 216 are examples of computer readable media that can store programming instructions executable on processor 208. Furthermore, non-volatile storage unit 212 and volatile storage 216 are also examples of memory units and/or memory modules.

Non-volatile storage unit 212 can store data 250 including the one or more given conditions. When the processor 208 determines that the one or more given conditions are present in the data 250, the processor can transmit an alert to device 103. Furthermore, it is to be understood that results of the data analysis described above can be used by the processor 208 to determine when an alert is to be transmitted to device 103 in a P2P session, as will be described in further detail below.

Processor 208 in turn can also be configured to communicate with a display 224, and an optional microphone 226 and an optional speaker 229. Display 224 comprises any suitable one of or combination of CRT (cathode ray tube) and/or flat panel displays (e.g. LCD (liquid crystal display), plasma, OLED (organic light emitting diode), capacitive or resistive touchscreens, and the like.

Microphone 226, when present, comprises any suitable microphone for receiving sound data, which can be transmitted to device 101. Speaker 229, when present, comprises any suitable speaker for providing sound data at device 101. It is appreciated that microphone 226 and speaker 229 can be used in combination at device 101 to conduct a voice call, for example with device 103.

In some implementations, input device 200 and display 224 are external to device 101, with processor 208 in communication with each of input device 200 and display 224 via a suitable connection and/or link.

Processor 208 also connects to a network communication interface 228, also referred to hereafter as interface 228, which can be implemented in some implementations as one or more radios configured to communicate over link 106. In general, it will be understood that interface 228 is configured to correspond with the network architecture that is used to implement link 106. In other implementations a plurality of links with different protocols can be employed and thus interface 228 can comprise a plurality of interfaces to support each link.

Interface 228 is further enabled to communicate with camera 105 over link 108, and hence interface 228 is configured to correspond with the network architecture that is used to implement link 106.

Indeed, it should be understood that in general a wide variety of configurations for device 101 are contemplated.

Figure 3:
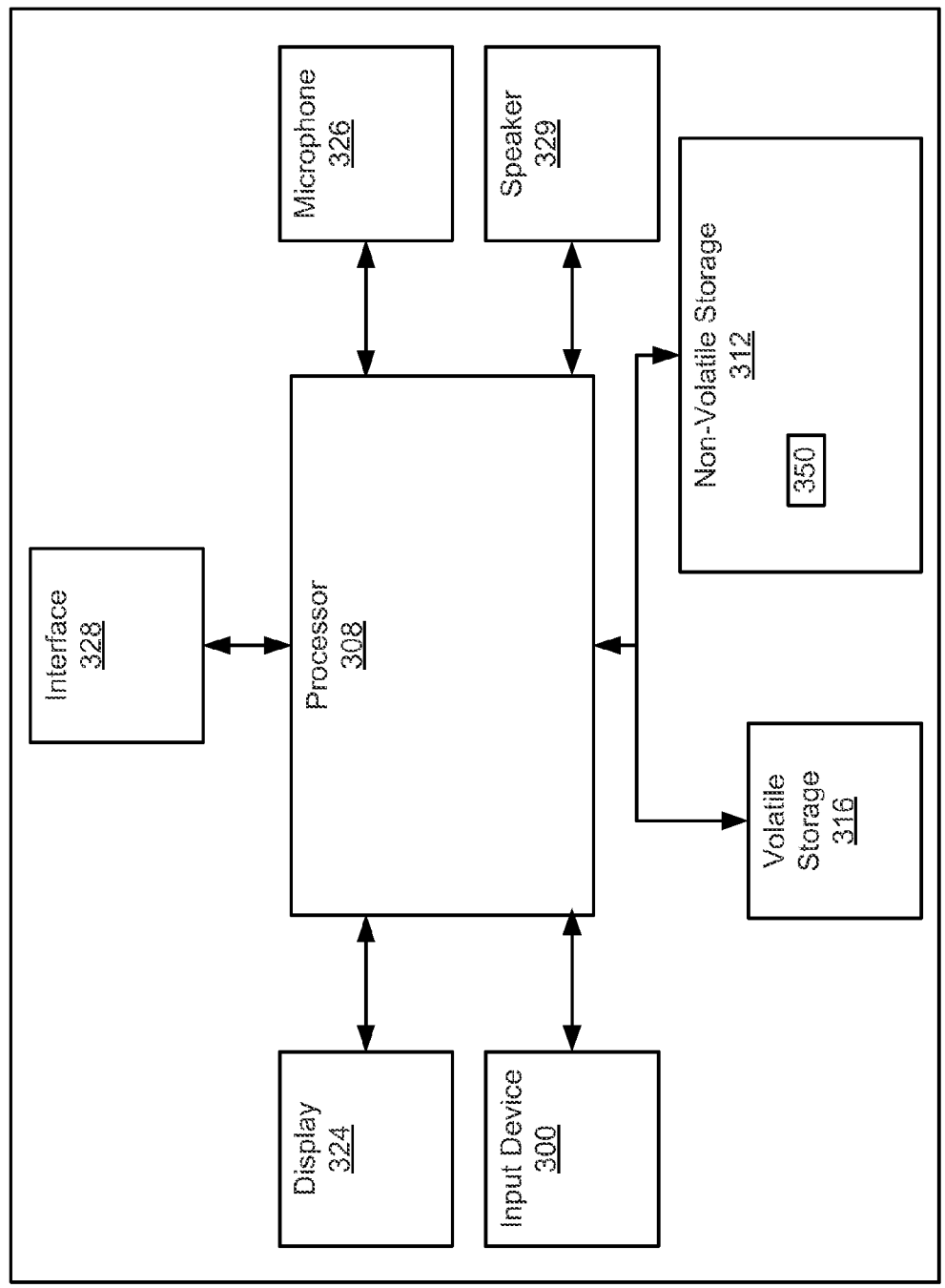
FIG. 3 depicts device for receiving automated alerts, according to non-limiting implementations.

Attention is next directed to FIG. 3, which depicts a schematic diagram of device 103 according to non-limiting implementations. It is appreciated that device 103 can be substantially similar to, or different from, device 101. In any event, FIG. 3 is substantially similar to FIG. 2, with like elements having like numbers, however preceded by a "3" rather than a "2". Device 103 comprises at least one input device 300 generally enabled to receive input data. It is to be understood that input device 300 can be similar or identical to input device 200, and can comprise any suitable combination of input devices. Input from input device 200 is received at processor 308. Processor 308 is configured to communicate with a non-volatile storage unit 312 and a volatile storage unit 316. Programming instructions that implement the functional teachings of device 103 as described herein are typically maintained, persistently, in non-volatile storage unit 312 and used by processor 308 which makes appropriate utilization of volatile storage 316 during the execution of such programming instructions. Those skilled in the art will now recognize that non-volatile storage unit 312 and volatile storage 316 can be examples of computer readable media similar to non-volatile storage unit 212 and volatile storage 216.

Processor 308 in turn can also be configured to communicate with a display 324, and an optional microphone 326 and an optional speaker 329. In addition, processor 308 also connects to a network communication interface 328, also referred to hereafter as interface 328. In general, it will be understood that interface 328 is configured to correspond with the network architecture that is used to implement link 106. In other implementations a plurality of links with different protocols can be employed and thus interface 328 can comprise a plurality of interfaces to support each link.

In addition, non-volatile storage device 312 can comprise data 350 indicative of conditions for entering a privacy mode.

It is further appreciated that while, in FIG. 1, devices 101, 103 are depicted as mobile communication devices, present implementations are not so limited. Rather, it is appreciated that FIG. 1 is an example only and that each of devices 101, 103 can comprise any suitable communication device as described above.

Figure 4:
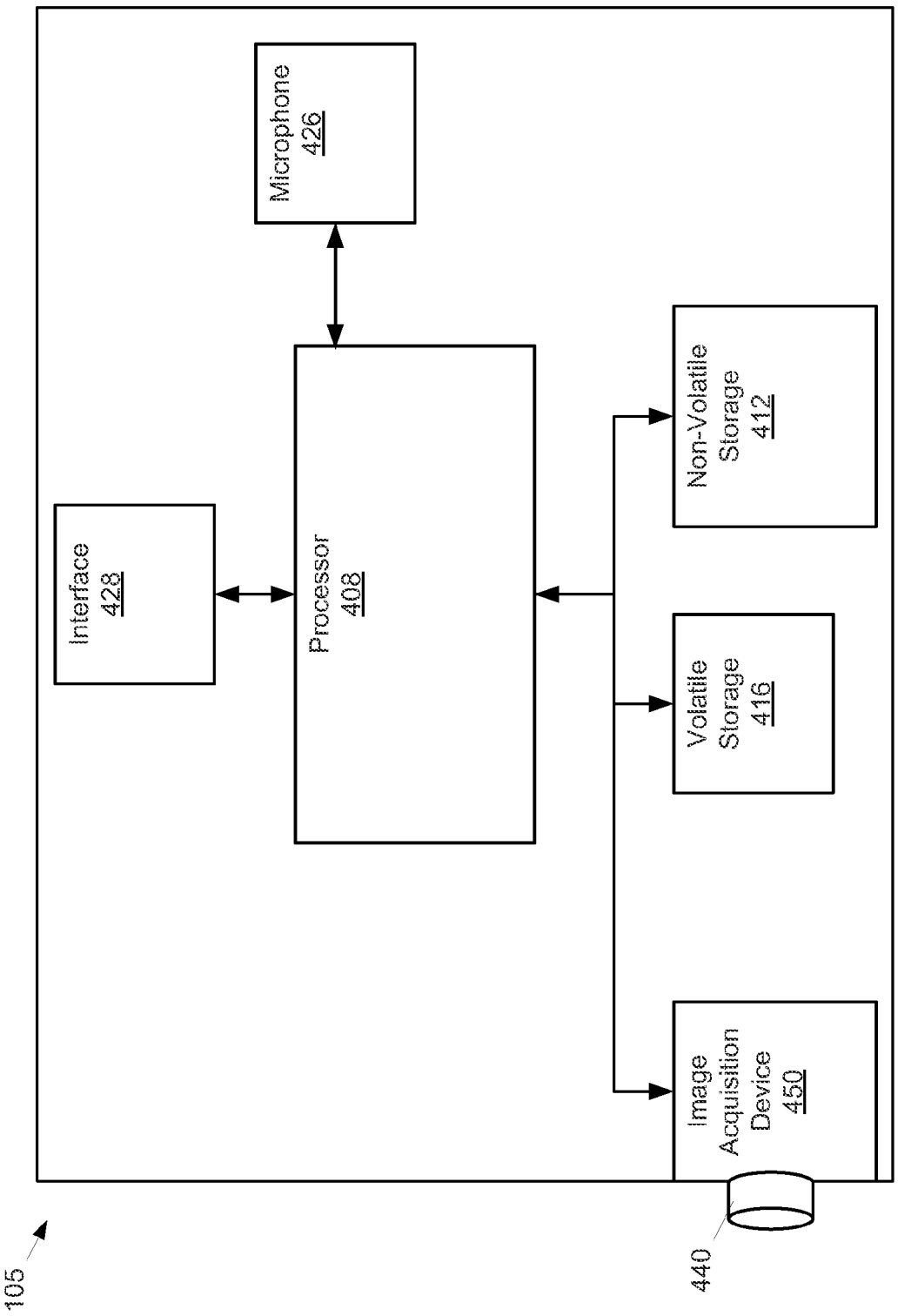
FIG. 4 depicts a camera device for acquiring data for providing automated alerts, according to non-limiting implementations.

Attention is next directed to FIG. 4, which depicts a schematic diagram of camera 105 according to non-limiting implementations. Camera 105 comprises any suitable camera device for acquiring images, and communicating with device 103, including, but not limited to, a CCD (charge coupled device), a digital camera, and a digital video camera. It is appreciated that elements of camera 105 can be substantially similar to, or different from, elements of device 103. In any event, camera 105 comprises a processor 408, non-volatile storage 412, volatile storage 416 and interface 428. Processor 408, non-volatile storage 412, and volatile storage 416 can be respectively similar to processor 208, non-volatile storage 212, and volatile storage 216. Interface 428 can be similar to interface 228, however enabled to communicate with device 101 over link 106. Camera 105 further comprises a lens 440 and an image acquisition device 450, including but not limited to a CCD for acquiring images in a field of view of lens 440. Camera 105 is generally enabled to acquire images via lens 440 and device 450, and transmit images to device 101 via interface 428 and link 108. In some implementations, processor 408 can process images prior to transmission. In some implementations images can be stored at non-volatile storage 412. However, in other implementations, at least non-volatile storage 412 is optional, with processor 408 and volatile storage 416 used primarily in the acquisition and transmission of images. Camera 105 can optionally comprise a microphone 426 for acquiring audio data.

Figure 5:
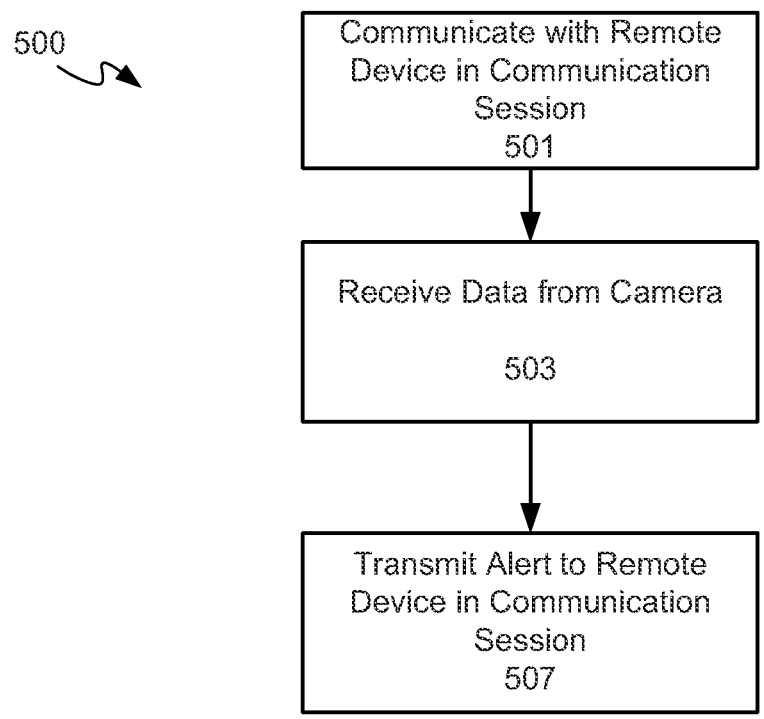
FIG. 5 depicts a method for automated alerts, according to non-limiting implementations.

Attention is now directed to FIG. 5 which depicts a method 500 for automated alerts, according to non-limiting implementations. In order to assist in the explanation of method 500, it will be assumed that method 500 is performed using system 100. Furthermore, the following discussion of method 500 will lead to a further understanding of system 100 and its various components. However, it is to be understood that system 100 and/or method 500 can be varied, and need not work exactly as discussed herein in conjunction with each other, and that such variations are within the scope of present implementations.

It is appreciated that method 500 is implemented in system 100 by processor 208 of device 101. Method 500 will be described with further reference to FIG. 6, which is substantially similar to FIG. 1, with like elements having like numbers.

At block 501, processor 208 of device 101 communicates with one or more remote communication devices 103 in a communication session, such as peer-to-peer (P2P) P2P session 601, via communication interface 228, including but not limited to a an SMS session, an MMS session, a text message session and a BBM™ session. It is appreciated that P2P session 601 can be based on an identifier of P2P session 601 such that each message in P2P session 601 is transmitted with the identifier to indicate that the message is associated with P2P session 601. Hence, P2P session 601 need not be a connection between devices 101, 103, but can be based on a packet-based protocol. P2P session 601 can be considered to be open and/or active when an application for exchanging messages in P2P session 601 is open and/or being rendered and/or being processed at device 101; for example, in some implementations, P2P session 601 can be started and not explicitly closed when the associated application is closed and/or minimized, and can be started again once the associated application is again open and/or maximized. Hence, in some implementations, method 500 can include a check as to whether P2P session 601 is one or more of open and active, and method 500 can terminate when P2P session 601 is not one or more of open and active, or P2P session 601 can terminate when P2P session 601 is one or more of closed and inactive.

At block 503, device 101 receives data from camera 105. For example, the data can include an indication 603 that a change has occurred in the images acquired by camera 105. In some implementations, indication 603 can comprise the data acquired by camera 105; in other implementations, processor 408 of camera 105 processes the data to determine when a change has occurred, and indication 603 comprises data indicative of the change. For example, when a number of people in view of camera 105 changes, data acquired by camera 105 will indicate the change and either device 101 can receive the data as indication 603 for processing to determine the change, or camera 105 can process the data to determine the change and include data indicative of the change in indication 603.

It is appreciated that when indication 603 comprises images acquired by camera 105, indication 603 can comprise either a stream of images or camera 105 can be enabled to transmit images before and after the change when it occurs. In some of the later implementations, camera 105 can hence be enabled to determine when a change has occurred in the images and transmit images acquired before and after the change. In other implementations, camera 105 can further comprise a motion detector enable to detect motion in a view of camera 105 and transmit images acquired before motion was detected and after motion was detected.

In any event, it is further appreciated that one or more of device 101 and camera 105 is hence enabled to determine when a change has occurred in data acquired by camera 105. Hence, one or more of device 101 and camera 105 is enabled to process images to determine such a change. For example, when the data comprises images, one or more of device 101 and camera 105 is enabled to process images to determine such a change for example by comparing a current image with a previous image to determine differences there between. In yet further implementations, one of more of device 101 and camera 105 is enabled to determine whether given features are in the images, such as people. For example, as discussed below, data 250 can comprise a given condition for transmitting an alert when a number of people in images increases; hence, in these implementations, one or more of device 101 and camera 105 is enabled to distinguish people from other features, such as pets; hence, for example, a pet entering a view of camera 105 won't trigger an alert in association with the above described condition, but a person will trigger an alert.

Figure 6:
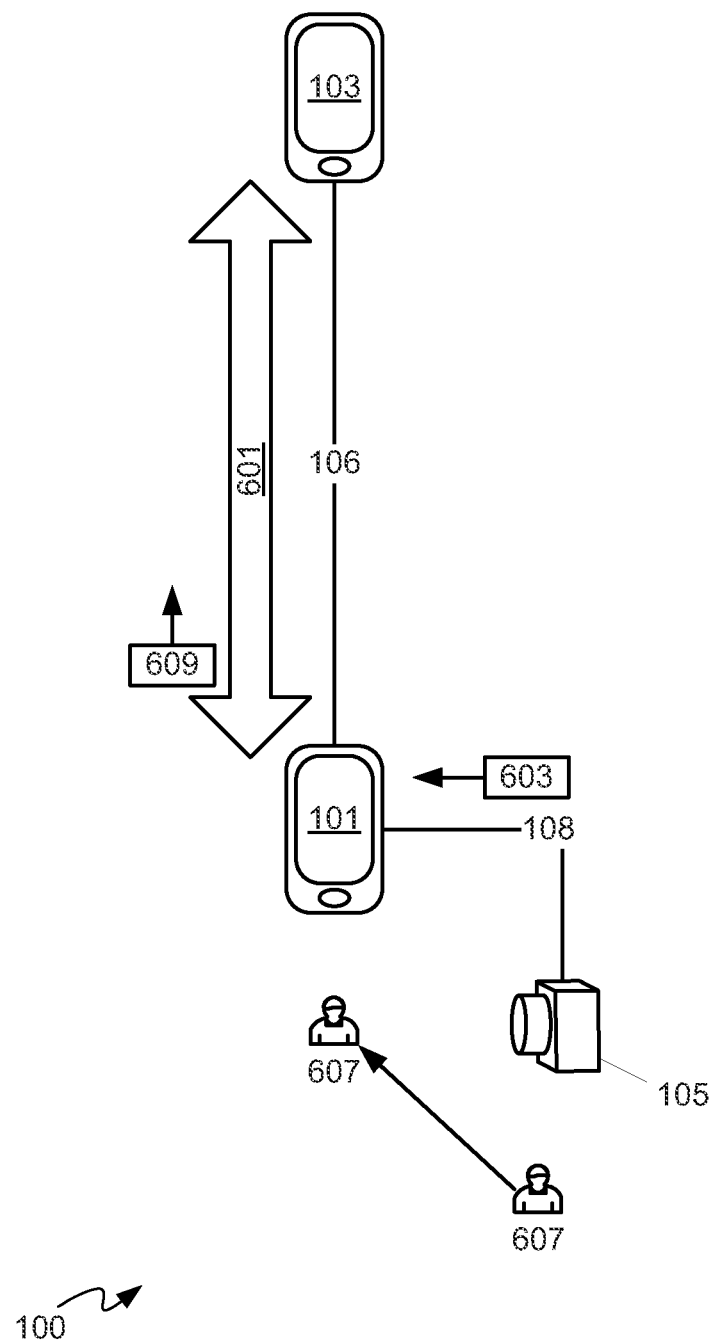
FIG. 6 depicts a system for automated alerts, according to non-limiting implementations.
Figure 7B:
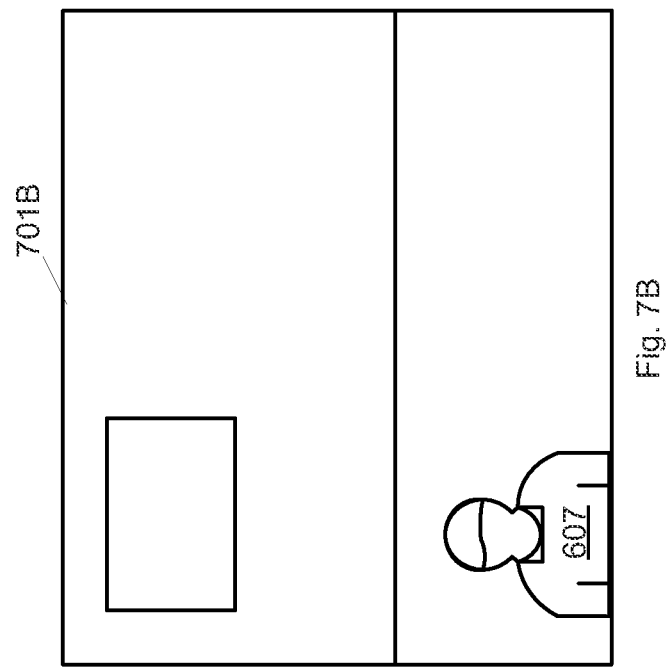
FIGS. 7A-7B depict images acquired for providing automated alerts, according to non-limiting implementations.
Figure 7A:
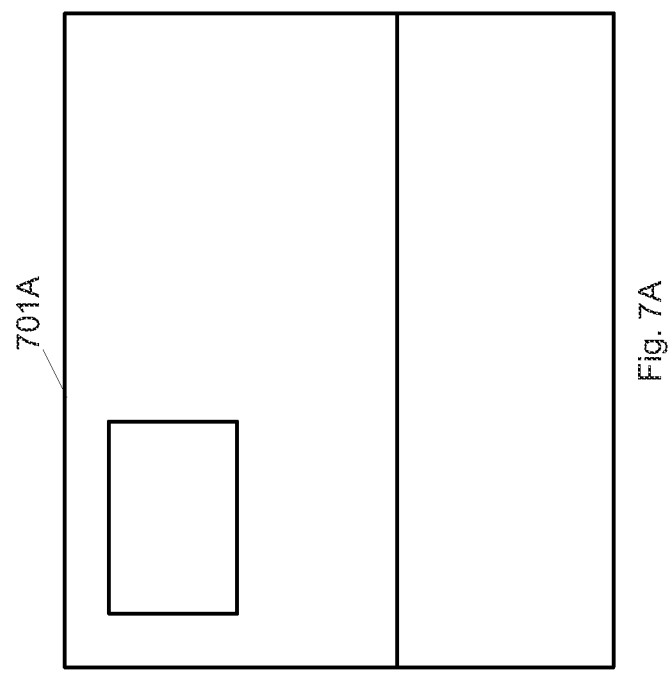

A non-limiting example of a change in images acquired by camera 105 is depicted with reference to FIGS. 6 and 7A-7B, wherein FIGS. 7A and 7B depict images 701A, 701B acquired by camera 105 when a person 607 moves (as indicated by the arrow in FIG. 6) into a view of camera 105 while P2P session 601 is active. For example, image 701A comprises a view of camera 105 before person 607 moves into the view, and image 701B comprises the view of camera 105 after person 607 moves into the view. Hence, in these example implementations, the change comprises an increase in the number of persons in images acquired by camera 105.

However, in some implementations, data acquired by camera 105 can comprise audio data acquired at microphone 426; for example, microphone 426 can detect audio of a person speaking, a door opening or closing and the like.

Figure 8:
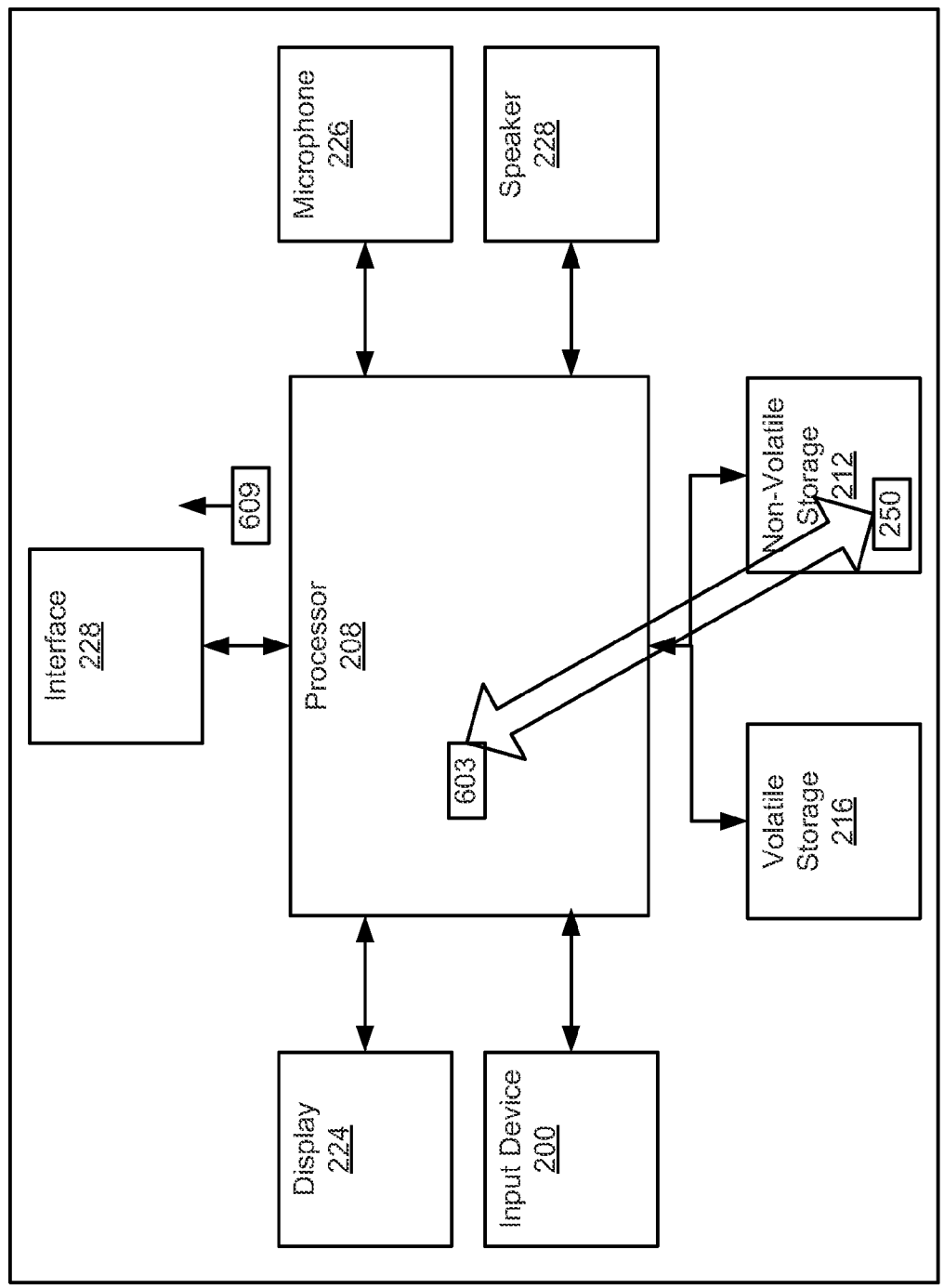
FIG. 8 depicts the device of FIG. 2 generating an automated alert, according to non-limiting implementations.

At block 507, an alert 609 is transmitted to one or more devices 103 in the communication session, such as P2P session 601, based on the data 250. In some embodiments, the alert 609 can be optionally indicative of a given condition, such as a change in the data 250. Furthermore, in the present embodiment, alert 609 can be transmitted as a message in P2P session 601. In other words, in the embodiment depicted in FIG. 8, which is substantially similar to FIG. 2, with like elements having like numbers, indication 603 is compared to data 250 and when a change indicated in indication 603 meets a given condition stored in data 250, alert 609 is transmitted to device 103 via interface 228 and link 106.

In a variation of method 500, the processor 208 of device 101 can be generally enabled to analyze the data acquired by camera 105 to determine if a change has occurred and determine whether a change indicated by indication 603 comprises a given condition, for example one or more given conditions represented by at least a portion of data 250. For example, data 250 can include a given condition that includes, but are not limited to: "when a number of people increases in images acquired by camera, transmit an alert"; "increase in a number of people"; "when a new voice signature is detected, transmit an alert"; "when a sound of a door opening or closing is detected, transmit an alert"; and the like. However, such examples are not to be construed as limiting and it is appreciated that data 250 can comprise any suitable condition for transmitting an alert to device 103 in any suitable format.

Indeed, any suitable given condition is within the scope of present implementations. Examples of given conditions for when alert 609 can be transmitted in P2P session 601 can include, but are not limited to: a number of people increasing, a number of people decreasing, a door opening, a door closing, a movement, and the like. Indeed, it is appreciated that any suitable given condition is within the scope of present implementations. It is also appreciated that data 250 can be provisioned at device 101 and/or configured by a user of device 101.

Therefore, it is to be understood that when no change meeting a given condition is detected, block 503 can repeated until a change that meets a given condition stored in data 250 is detected.

Alert 609 is generally enabled to provide an alert that the given condition was met and, in some implementations, comprise an indication that the given condition was met. In a non-limiting example, alert 609 can comprise text: "Warning! The number of people in the area around Bob has increased and privacy may be compromised. Watch what you say!" (with "Bob" being a user associated with device 101).

It is further appreciated that alert 609 is transmitted automatically such that device 103 is automatically notified of the change in P2P session 601.

Attention is next directed to FIG. 9A, which depicts a GUI (Graphic User Interface) 901 rendered at display 324, GUI 901 associated with an application for processing P2P session 601 at device 103. Specifically, GUI 901 comprises a message window 903 and optionally a chat list 905 of device 103 after alert 609 is received at device 103. Message window 903 is depicted as rendered after alert 609 has been received. For example, and text indicative of alert 609 is provided as a message in message window 903, alerting a user associated with device 103 of the change detected by camera 105.

It is further appreciated that while alert 609 has been described above with a loss of privacy, alert 609 can indicate when privacy increases, such as when a number of people in the images acquired by camera 105 decreases. In a non-limiting example, alert 609 can comprise text: "The number of people in the area around Bob has decreased and privacy has been improved".

However, alert 609 can also be generic, without making reference to the given condition, as in the following non-limiting examples: "Privacy of this session may be compromised" or "Privacy has improved". It is appreciated that content of alert 609 is generally appreciated to be non-limiting however, and alert 609 can comprise any suitable format.

In any event, respective text to be incorporated into alert 609 can be stored in data 250 in association with each one or more given condition.

It is yet further appreciated that one or more of device 101 and camera 105 can be further enabled to analyse the data acquired by camera 105 to determine one or more identifiers respectively associated with people in images acquired by camera 105. Alert 609 can comprises the one or more identifiers determined by device 101 and/or camera 105. For example, one or more of device 101 and camera 105 can comprise face recognition software to determine not only a number of people in view of camera 105 but who they are; faces could be compared to a database accessible by one or more of device 101 and camera 105 (i.e. stored at one or more of non-volatile storage 212, non-volatile storage 412, a remote database accessible by device 101 and/or camera 105 via a communication network) to determine respective identifiers of people in view of camera 105.

In any event, alert 609 can hence compromise one or more of the identifiers. In a non-limiting example alert 609 can comprise the text: "Warning, Bob's MOM has entered the room. Watch what you say!". This example is further depicted in FIG. 9B, which is substantially similar to FIG. 9A, with like elements having like numbers, but with the automatic alert message in message window 903 comprising an identifier of a person identified in an image acquired by camera 105.

However, identifiers are not limited to identifiers of the person, such as their name. For example, faces can be stored in a database in association with identifiers of communication devices associated with the faces including, but not limited to, phone numbers, personal identification numbers (PIN), IP addresses, network identifies and the like. Hence, alert 609 can comprise text including such an identifier; in a non-limiting example, alert 609 can comprise: "Warning, 6D23406 has entered the room. Watch what you say!", wherein "6D34506" comprises a PIN associated with the person identified in an image acquired by camera 105.

Furthermore, in some implementations, a chat list associated with P2P session 601 can be updated with one or more identifiers of people in view of camera 105 to indicate that the people associated with the one or more identifiers are near camera 105. Hence, in these implementations, alert 609 compromises an update to a chat list associated with P2P session 609. For example, FIG. 9C, which is substantially similar to FIG. 9A with like elements having like numbers, depicts chat list 905 updated to provide an identifier of a person identified in an image acquired by camera 105, as well as an option 911 to add them to P2P session 601.

It is also apparent from FIGS. 9A-9C that alert 609 is transmitted automatically without intervention from a user of device 101, such that data associated with alert 609 appears automatically in message window 903 and/or chat list 905.

Figure 19:
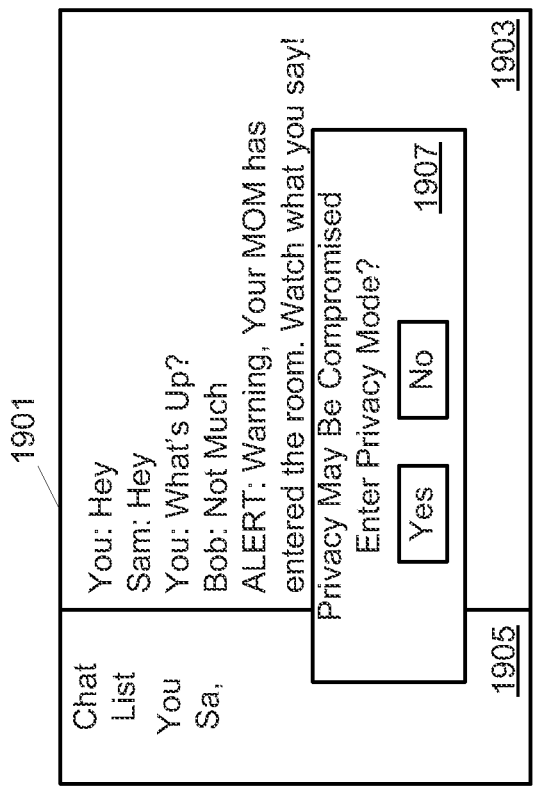
FIG. 19 depicts a Graphic User Interface (GUI) rendered at the device of FIG. 2 to enter a privacy mode, according to non-limiting implementations.

In some implementations it is appreciated that data associated with alert 609 can also be automatically rendered in a similar GUI at device 101, such that a user of device 101 is also informed of the change, for example see FIG. 19.

In yet further implementations alert 609 can be indicative that one or more devices 103 should enter a privacy mode. In some of these implementations, alert 609 can comprise a command to enter a privacy mode. In other implementations depicted in FIG. 10, which is substantially similar to FIG. 3, with like elements having like numbers, alert 609 can be compared with data 350 by processor 308 to determine whether alert 609 meets a condition for automatically entering a privacy mode, such as when a given person is identified in alert 609. Any other suitable condition for entering a privacy mode is within the scope of present implementations. For example, a condition for entering a privacy mode can also be based on proximity, such as proximity to device 101, which can be determined in any suitable manner, including but not limited to use of a GPS (global positioning system) device, determining whether link 106 comprises a local link, detecting device 101 using RFID (radio frequency identification, assuming that devices 101,103 are enabled therefor) detection, or the like. It is also appreciated that data 350 can be provisioned at device 103 and/or configured by a user of device 103.

Figure 10:
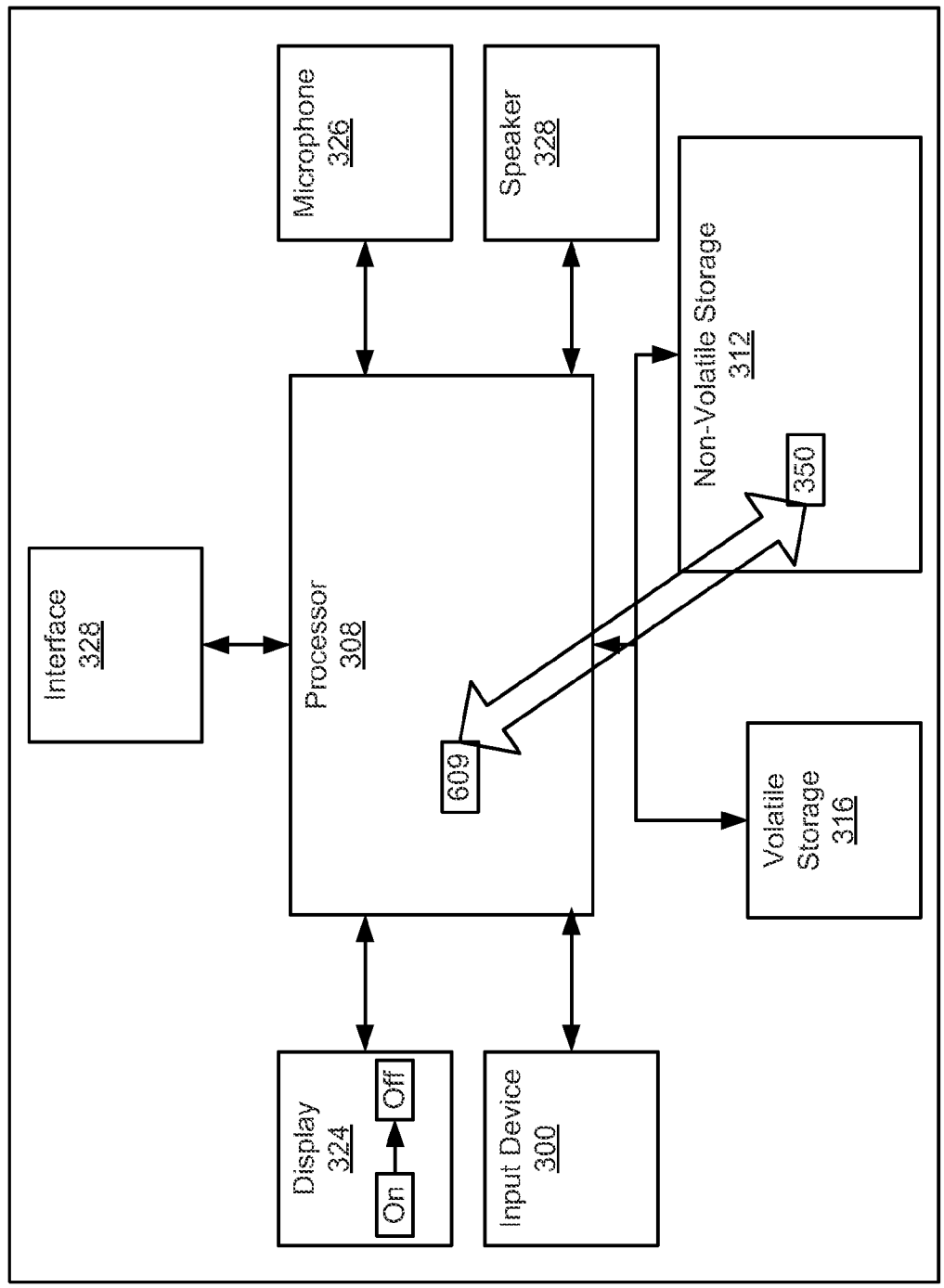
FIG. 10 depicts the device of FIG. 3 entering a privacy mode after receiving an automated alert, according to non-limiting implementations.

As further depicted in FIG. 10, a non-limiting example of a privacy mode comprises display 324 automatically turning off, however any suitable privacy mode is within the scope of present implementations, including but not limited to muting speaker 328, minimizing GUI 901 or the like. It is further appreciated that the privacy mode can be entered automatically when alert 609 is indicative that one or more devices 103 should enter a privacy mode, or an option for entering the privacy mode can be rendered at display 324 (similar to that described below with reference to FIG. 19).

Figure 11:
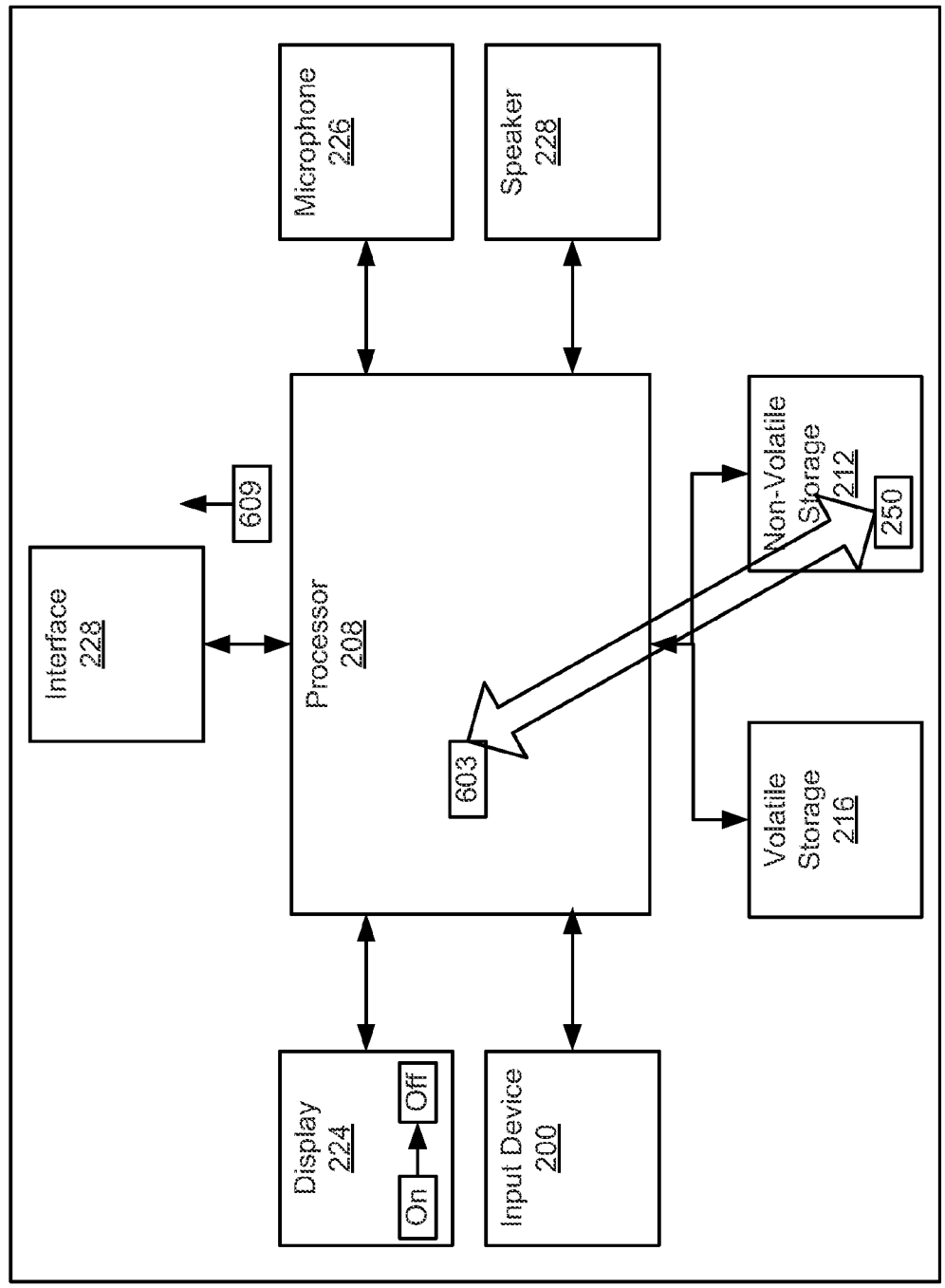
FIG. 11 depicts the device of FIG. 2 entering a privacy mode, according to non-limiting implementations.

Similarly, it is yet further appreciated that, in some implementations, processor 208 of device 101 can be enabled to place device 101 into a privacy mode when the change indicated in indication 603 comprises the given condition stored in data 250. For example, FIG. 11 is similar to 8, with like elements having like numbers, but further depicts device 101 entering a privacy mode by turning display 224 off. However, device 101 can enter any suitable privacy mode as described above. It is further appreciated that the privacy mode can be entered automatically, or an option for entering the privacy mode can be rendered at display 224 (similar to that described below with reference to FIG. 19). Also, a method of entering a privacy mode is described below with reference to FIG. 18.

It is yet further appreciated that as camera 105 is distinct from device 101, camera 105 can be placed at a distance from device 101 thereby enabling camera 105 to act as a sentry device such that device 101 can be used in private. For example, camera 105 could be positioned to monitor a hallway outside a boardroom while device 101 is used inside the boardroom. When indication 603 is indicative that a change that meets a given condition has occurred in data acquired by camera 105, alert 609 can be transmitted and optionally device 101 can enter a privacy mode.

Figure 12:
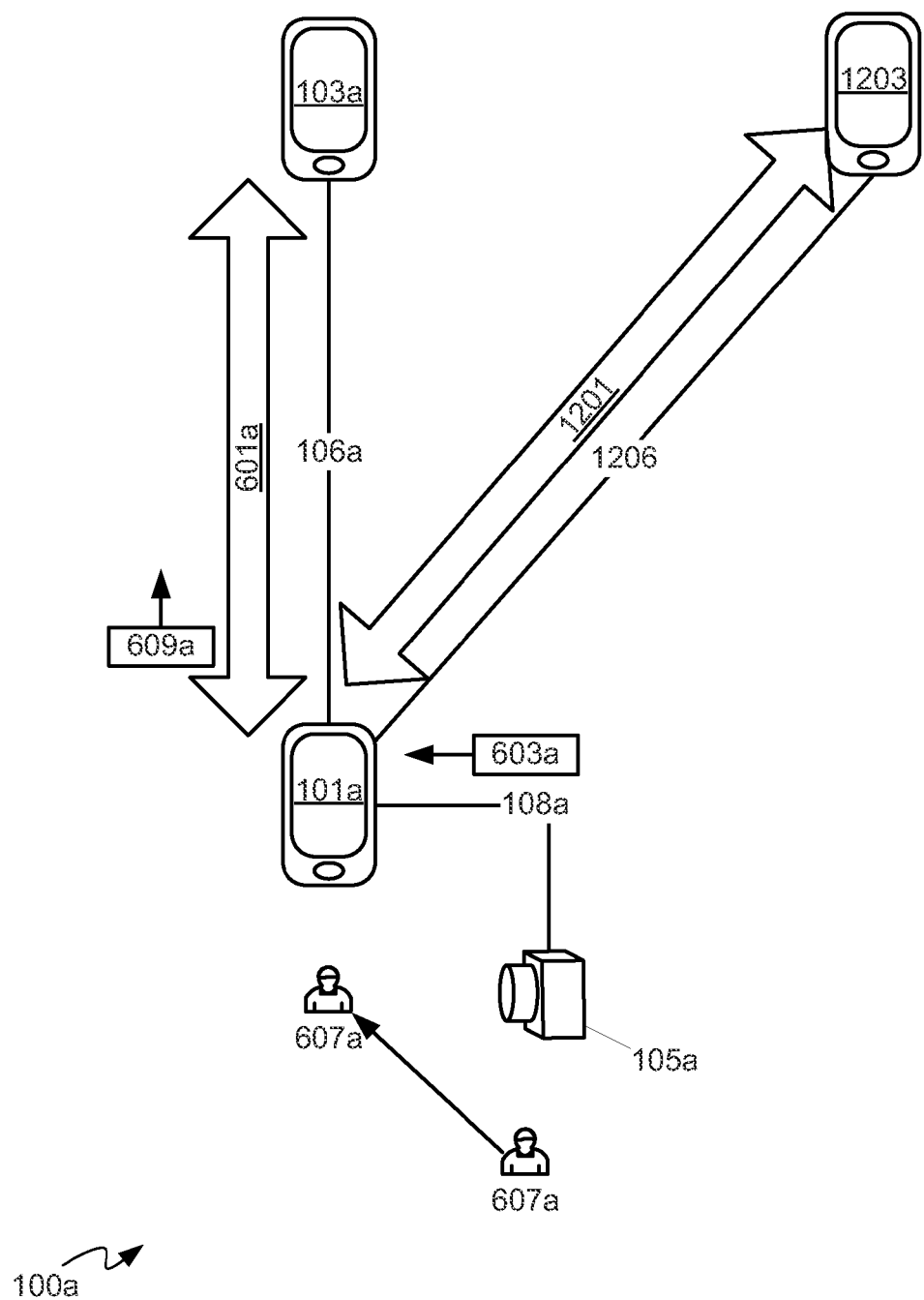
FIGS. 12 and 13 depict systems for automated alerts, according to non-limiting implementations.

Attention is next directed to FIG. 12, which is substantially similar to FIG. 6 with like elements having like numbers, however with an "a" appended thereto. Furthermore, in FIG. 12, device 101*a* is engaging in a P2P session 601*a* with device 103*a* via link 106*a*, as well as a video chat session 1201 with a remote device 1203 via link 1206. It is appreciated that camera 105*a* is being used as the video device to originate video images via link 108*a* to device 101*a*. It is further appreciated that link 1206 is similar to link 106, with link 1206 being enabled to support video chat session 1201. It is also appreciated that while video chat session 1201 is depicted as being with device 1203 and hence unrelated to P2P session 601*a*, in other implementations, video chat session 1201 can be with the same remote device as P2P session 601.

In any event, processor of device 101*a* is hence enabled to communicate with one or more remote communication devices 1203, in video chat session 1201, different from P2P session 601, via a communication interface similar to interface 228. Furthermore, method 500 can be implemented in device 101*a* with indication 603*a* comprising data acquired by camera 105*a* in video chat session 1201.

Heretofore, implementations where camera 105, 105*a* is distinct from respective device 101, 101*a* were described. However, other implementations are within the scope of present implementations, as will now presently be described.

Figure 13:
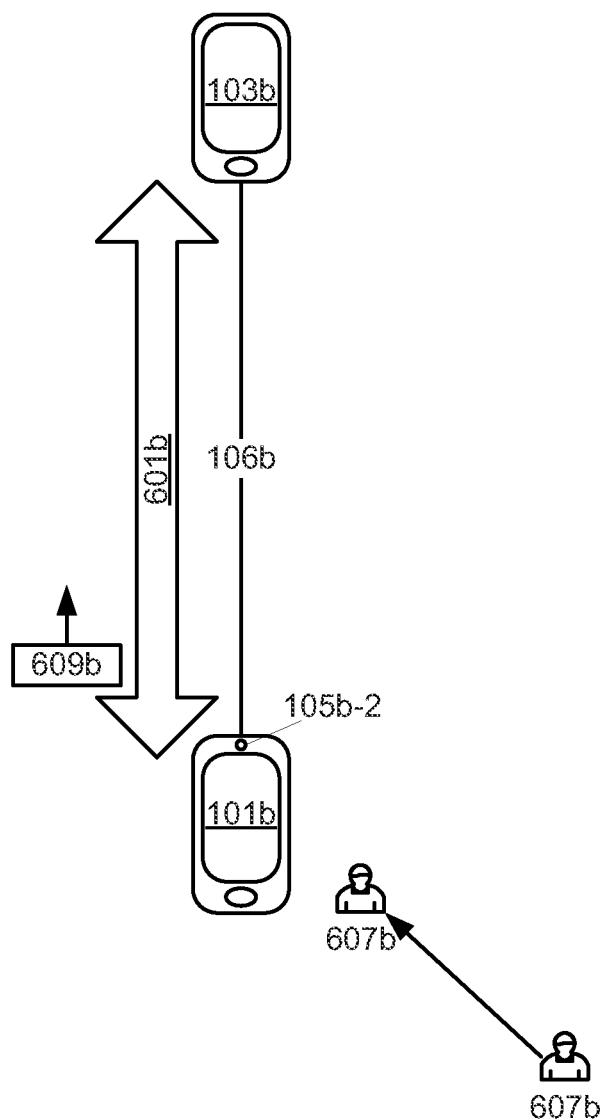
Figure 14:
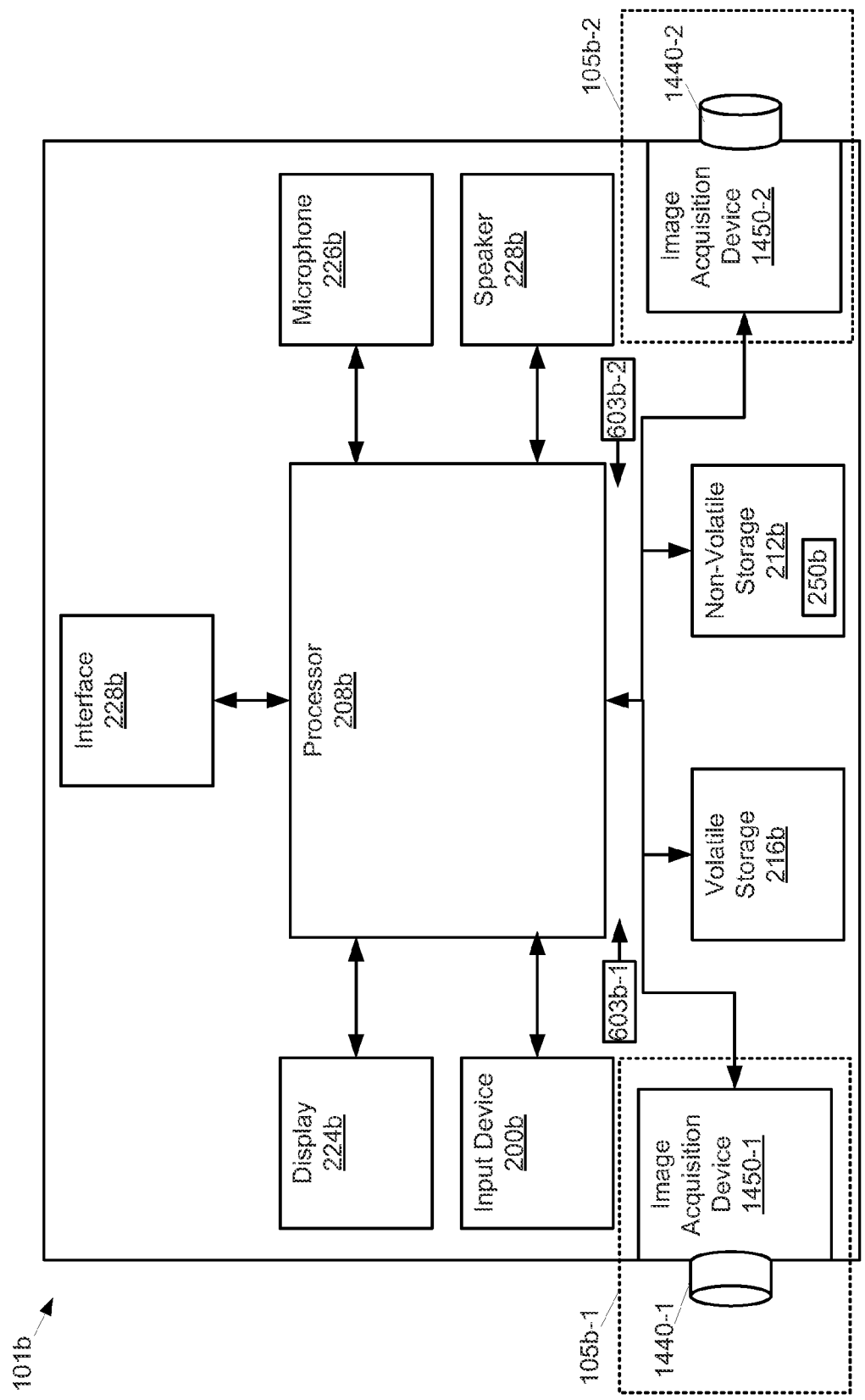
FIG. 14 depicts a device for providing automated alerts, according to non-limiting implementations.

For example, attention is directed to FIGS. 13 and 14 which are respectively similar to FIGS. 1 and 2, with like elements having like numbers, however a "b" appended thereto. In these implementations, device 101*b* comprises at least one camera device 105*b*-1 which comprises a lens 1440-1 and an image acquisition device 1450-1, each respectively similar to lens 440 and image acquisition device 450. In some implementations, device 101*b* comprises an optional second camera 105*b*-2, which in turn comprises a lens 1440-2 and an image acquisition device 1450-2, each respectively similar to lens 440 and image acquisition device 450. It is appreciated that camera 105*b*-1 is located at one of a front and a rear of device 101*b* such that images of an area proximal one the front and the rear of device 101*b* can be acquired. Cameras 105*b*-1, 105*b*-2 will also be referred to hereafter generically as a camera 105*b* and collectively as cameras 105*b*. This convention will be used throughout the specification hereafter.

When device 101*b* comprises optional camera 105*b*-2, camera 105*b*-2 can be located at the other of a front and a rear of device 101*b* such that images of an area proximal one the front and the rear of device 101*b* can be acquired by camera 105*b*-2. Hence, when one of cameras 105*b* is present either the front or rear of device 101*b* can be monitored, while when both of cameras 105*b* are present both the front or rear of device 101*b* can be monitored. It is appreciated that camera 105*b*-2 is depicted in FIG. 13, however only lens 1440-2 is visible.

It is further appreciated that processing and/or storing of data acquired by cameras 105*b* occur at processor 208*b* and non-volatile storage 212*b*.

In any event cameras 105*b* each generate respective indications 603*b*-1, 603*b*-2 (i.e. indications 603*b*), similar to indication 603, which can be processed by processor 208*b* to determine whether a change that has occurred in images acquired by one or more of cameras 105*b* comprises a given condition stored in data 250*b*. Hence, method 500 is implementable in device 101*b* to generate alert 609*b*.

Figure 15:
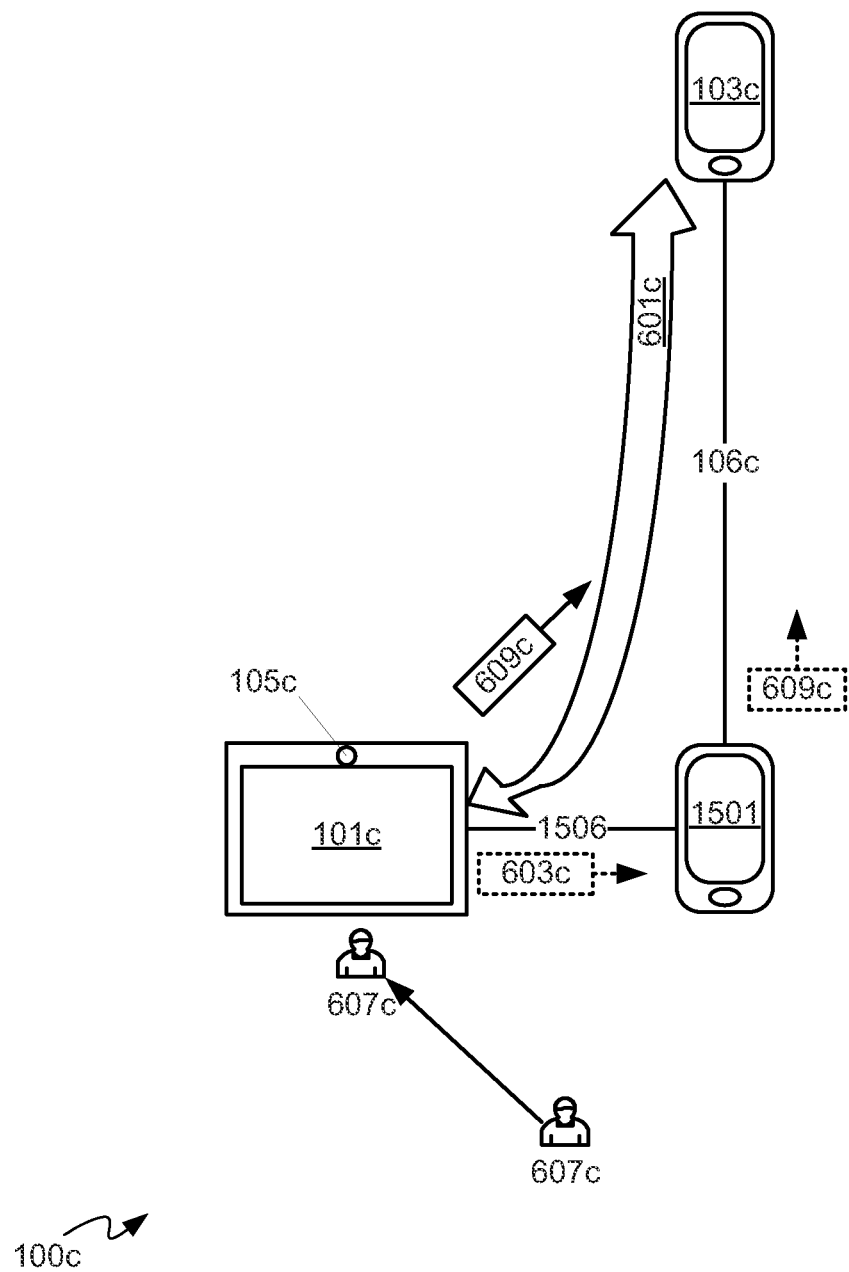
FIGS. 15 and 16 depict systems for automated alerts, according to non-limiting implementations.

Attention is next directed to FIG. 15, which is similar to FIG. 6, with like elements having like numbers, however with a "c" appended thereto. In these implementations device 101*c* is enabled to communicate with device 103*c* in P2P session 601*c* via a third communications device 1501 local to device 101*c* and in communication with device 101*c* via a link 1506, which can be a wired and/or wireless local link as desired, including but not limited to any suitable combination of USB (universal serial bus) cables, serial cables, wireless links, Bluetooth links, NFC (near field communication) links, WiFi links, packet based links, analog networks, access points, and the like, and/or a combination.

Figure 17:
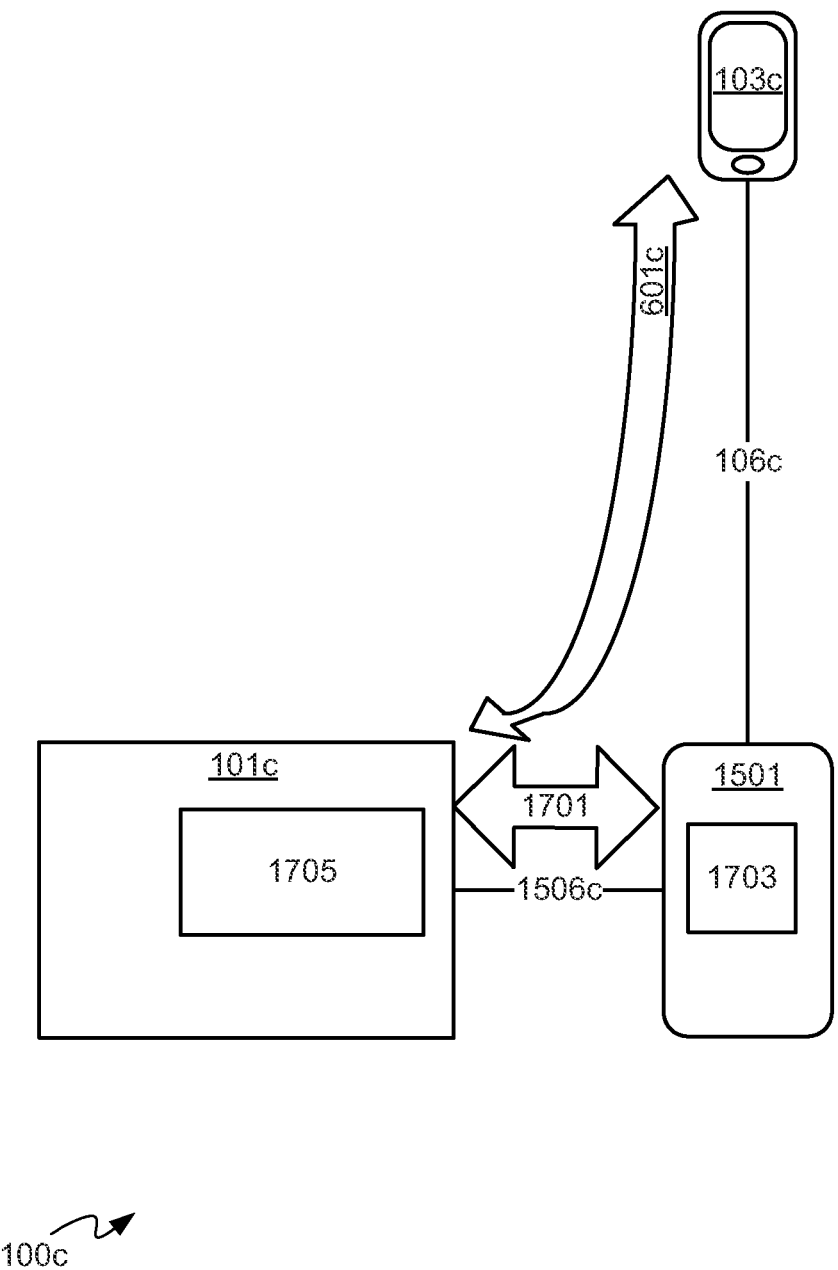
FIG. 17 depicts components of the devices in the system of FIG. 15, according to non-limiting implementations.

For example, reference is next made to FIG. 17 which is similar to FIG. 15, with like elements having like numbers, however FIG. 17 is simplified for clarity, and further depicts software components of devices 101*c*, 1501, which are appreciated as being processed by respective processors of devices 101*c*, 1501.

In any event, a web protocol connection 1701 can be established on link 1506*c* between device 101*c* and device 1501, with data being exchanged between device 101*c* and device 1501 via web protocol connection 1701, including but not limited to data in P2P session 601*c*; it is appreciated that, in these implementations, device 1501 can operate a web server 1703 while device 101*c* can operate a web client 1705. Web server 1703 represents an implementation of an endpoint of web protocol connection 1701 that listens for requests from a web client 1705 and responds to the requests. Similarly, web client 1705 represents an implementation of another endpoint of web protocol connection 1701 that sends requests to web server 1703 and then processes the response message.

Such web clients are generally associated with a web browser and displayed via a user interface. However, in present implementations web client 1705 comprises a background process that performs the functionality of web client 1705 without displaying a web browser at device 101*c*.

It is further appreciated, however, that communications between device 101*c* and device 1501 are not limited to a web protocol, but that a web protocol provides one non-limiting example of how device 101*c* and device 1501 can communicate.

Returning to FIG. 15, device 101*c* comprises a camera 105*c* similar to device 101*b* described above, however only a lens of camera 105*c* is visible.

Further, method 500 is implemented at device 101c, with an alert 609c transmitted by device 101c to device 103c when a change in data acquired by camera 105c meets a given condition, as described above.

However, it is yet further appreciated that, in alternative implementations represented by the stippled lines, method 500 can also be implemented at device 1501; in these implementations, device 101c transmits an indication 603c to device 1501 that a change has occurred in data acquired by camera 105c, and device 1501 determines whether the change meets the given condition. If so, device 1501 transmits alert 609c to device 103c.

Figure 16:
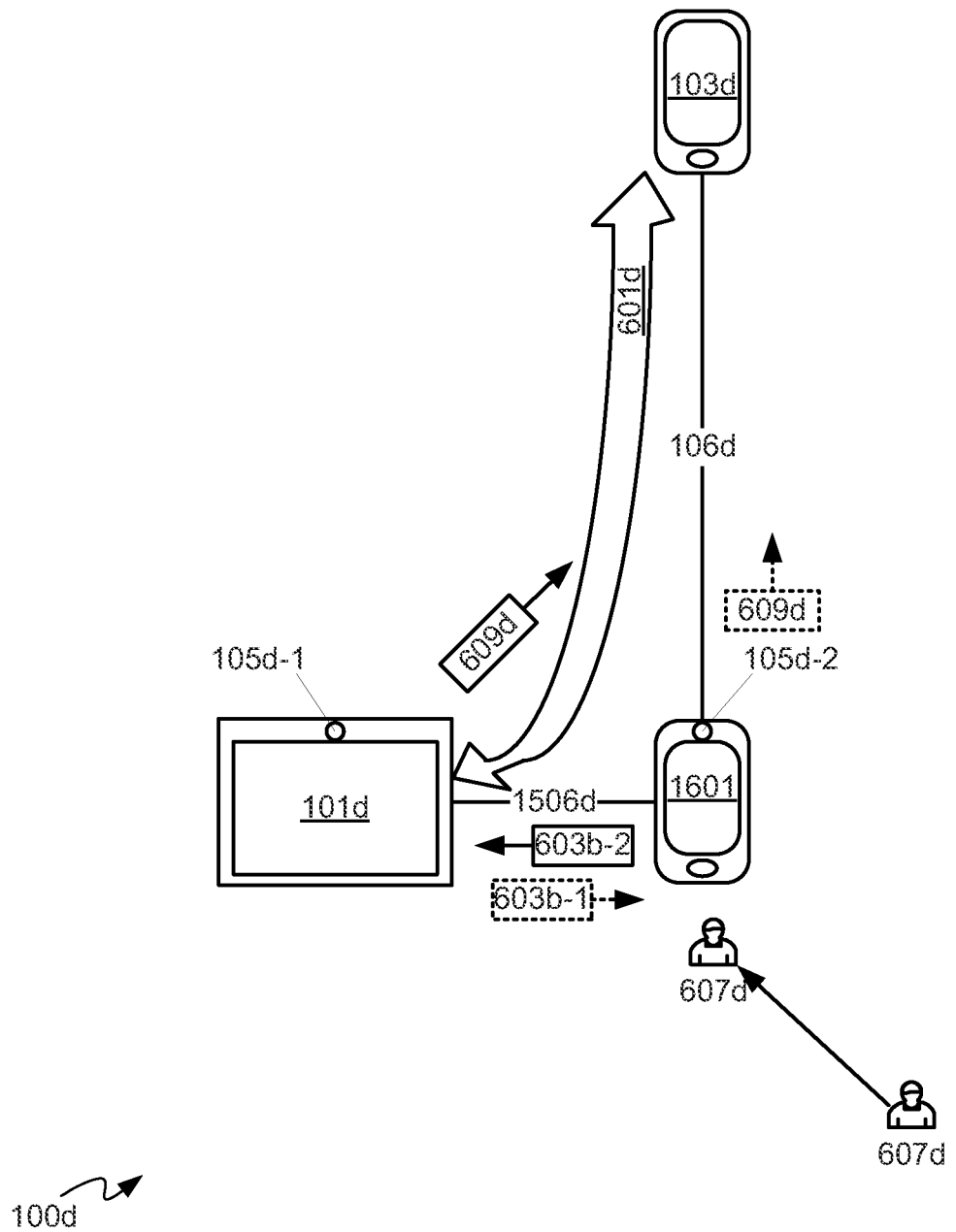

Attention is next directed to FIG. 16, which is similar to FIG. 15, with like elements having like numbers, however with a "d" appended thereto, rather than a "c." Furthermore, device 1601 is similar to device 1501. However, in FIG. 16, each of devices 101d and device 1601 comprises a respective camera 105d, similar to cameras 105b. In these implementations, alert 609d can be transmitted when a change in data acquired by either of cameras 105d meets a given condition.

It is appreciated that, in these implementations, method 500 can be implemented in one or both of devices 101d and 1601. When method 500 is implemented at device 101d, devices 1601 transmits indication 603b-2 (similar to indication 603) to device 101d, and device 101d can transmit alert 609d based either on indication 603b-2 or an indication received from camera 105d-1.

Similarly, when method 500 is implemented at device 1601, device 101d transmits indication 603b-1 (similar to indication 603) to device 1601, and device 1601 can transmit alert 609d based either on indication 603b-1 or an indication received from camera 105d-2.

However, in yet alternative implementations, method 500 can be implemented at device 1601 based on data acquired by camera 105d-2. In other words, device 1601 is communicating with device 103d in P2P session 601d, however device 1601 is merely acting as a conduit for message data exchanged between devices 101d, and 103d. However, when device 101d determines that a change in data acquired by device 1601 comprises a given condition, alert 609d is transmitted to device 103d. In other words, device 1601 originates a message in P2P session 601d in addition to merely being a conduit for messages between devices 101d, 103d. In some of these implementations, device 1601 also transmits an alert, similar to alert 609d, to device 101d to notify device 1601 of the change.

In any event, alert 609d can be generated based either on data acquired by one or more of cameras 105d. Such implementations enable monitoring of different areas such that device 1601 can be used a sentry device, as described above.

It should now be apparent that there are yet more alternative implementations and modifications possible, and that the above examples are only illustrations of one or more implementations. For example, in variants of system 1OOd, device 101d can be absent camera device 105d such that alert 601d is based on data acquired by device 1601.

It is yet furthermore apparent that the present implementations enable a communication device to be used to engage in a P2P session with a remote communication device, while one or more of the same communication device or another camera device monitors changes that occur either proximal the communication device and/or at a distance from the communication device, such that alerts of changes in privacy can be sent to the remote communication device. In alternative implementations, one or more of the communication device and the remote communication device can be enabled to enter a privacy mode based on the changes in privacy.

Furthermore, the communication device can be used to video chat while a P2P session is also used for both text and/or audio messages. When the communication device comprises a camera, the communication device can keep track of how many people are in the images being acquired in the video chat. If the number of people in the images changes, (e.g. a user's mom, boss, or the like walks behind them) then the communication device can send an automatic alert to the devices participating in the P2P session warning them that someone else has now appeared and hence people may want to "watch what they say." When face detection is enabled at the communication device, then the remote devices can even be specifically alerted as to who has entered the image.

In some implementations, the camera acquiring the images could be pointed in a given direction (e.g. at a party) and identifiers of any faces recognized could be added to the P2P session chat list so others in the P2P chat session can see who are nearby, and even added to the P2P session.

Furthermore, the camera could be positioned to detect audio or images, such that the communication device and the remote communication devices participating in the P2P session are alerted when someone comes into the room. This enables the camera device to act as a "sentry" device so that the P2P session can occur in private. Further, when a person is detected in the images acquired by the sentry device, the communication device, located nearby, is alerted to enter a privacy mode, for example, turning off or blanking a display. A user of the communication device could then can place the communication device down and act as though they are not using it.

Figure 18:
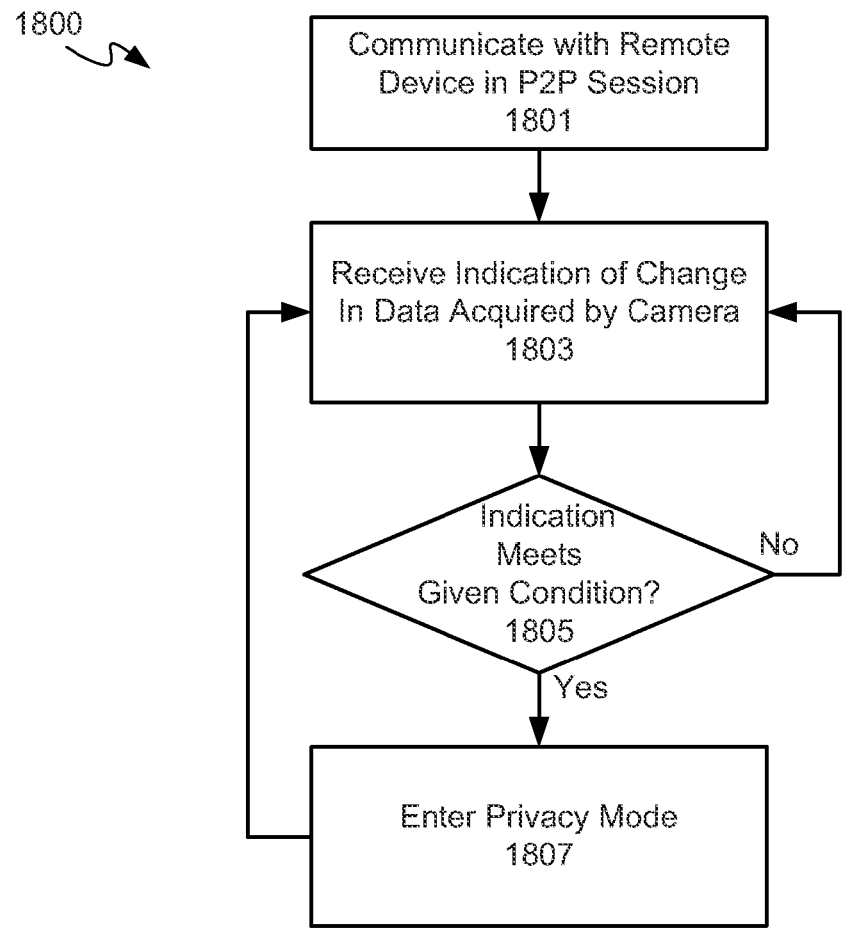
FIG. 18 depicts a method for entering a privacy mode, according to non-limiting implementations.

Hence, attention is next directed to FIG. 18, which depicts a method 1800 for placing a communication device into a privacy mode, according to non-limiting implementations. It is appreciated that method 1800 is substantially similar to method 500, with like blocks having like numbers, however starting with "18" rather than "5". For example, block 1801 is similar to block 501. Indeed, method 1800 proceeds similar to method 500, however when indication 603 meets a given condition, for example a given privacy condition at block 1805, at block 1807, processor 208 controls device 101 to enter a privacy mode, as described above. In some implementations the privacy mode can be entered automatically, while in other implementations an option to enter the privacy mode can be provided at device 101.

For example, FIG. 19 depicts a GUI 1901, similar to GUI 901 but rendered at device 101, GUI 1901 comprising a message window 1903 and a chat list 1905 similar to message window 903 and chat list 905 respectively. GUI 1901 further comprises a dialog box 1907 rendered at display 224 when block 1807 of method 1800 is performed. Dialog box 1907 optionally comprises an indication of a change in privacy (e.g. via text such as "Privacy may be compromised"), an indication to (for example) "Enter Privacy Mode" and selectable options ("Yes" and "No") to enter the privacy mode and reject entering the privacy mode. When the selectable option to enter the privacy mode is selected, device 101 enters the privacy mode; otherwise the privacy mode is not entered.

It is further appreciated that message window 1903 comprises an optional indication of the change ("ALERT: Warning, Your MOM has entered the room. Watch what you say!"), similar to those described above with reference to FIGS. 9A-9C.

It is further appreciated that while present implementations have been described with regard to P2P sessions, in other implementations, automated alerts triggered from changes in data acquired by camera devices can occur in other types of communication sessions that are not specifically peer-topeer, for example in e-mail exchanges between computing devices. Consider the following scenario: two communication devices, in communication via a communication network, are exchanging e-mail in a thread. While not specifically peer-to-peer, when a change has occurred in data acquired by a camera device in communication with one of the communication devices, an alert (e.g. an email) can be automatically transmitted, in the same thread, to the other of the two communication devices, similar to alert 609. In some implementations, when an indication from a camera device that a change has occurred in data acquired by a camera device, and the change comprises a given condition, a processor at the communication device receiving the indication can process email messages to determine whether there is a current thread, for example a thread where an email has been transmitted within a given time period of receiving the indication, such as 5 minutes, 10 minutes, or the like. Conditions can be stored at a memory device as to whether or not a given thread comprises a communication session on which an alert is to be transmitted. A non-limiting example of such condition is: when a thread comprises a last given number of messages have been transmitted within a given time period of receiving the indication, an alert is to be transmitted. A further non-limiting example of such a condition is: when a thread comprises a last message that has been transmitted within a given time period of receiving the indication, and further minimum time period separates a last given number of messages in the thread, an alert is to be transmitted. Any other suitable conditions are within the scope of present implementations.

It is hence appreciated that alerts can be transmitted in the communication session using the same communication pathway as the communication session. For example, in these implementations, when the communication session comprises a P2P session, the alert is transmitted in the P2P session as a P2P message with the same session identifier as the P2P session. Similarly, when the communication session comprises an email session in a given thread, the alert is transmitted as an email with the same session identifier as the emails, for example with the same subject line so that the alert will appear in the same given thread.

Hence, present implementations provide a communication device comprising: a processor and a communication interface, the processor enabled to: communicate with one or more remote communication devices in a communication session via the communication interface; receive an indication from a camera device that a change has occurred in data acquired by the camera device; and, in response, to the change comprising a given condition, transmit an alert indicative of the change to the one or more remote communication devices in the communication session. Further, alerts can be provided at the communication device where the transmitted (email) alert originates, similar to those described above with reference to FIG. 19. The transmitted (email) alert can also cause the receiving communication device to enter a privacy mode as described above.

Those skilled in the art will appreciate that in some implementations, the functionality of devices 101-101*d*, devices 103-103*d*, and devices 1501, 1601 can be implemented using pre-programmed hardware or firmware elements (e.g., application specific integrated circuits (ASICs), electrically erasable programmable read-only memories (EEPROMs), etc.), or other related components. In other implementations, the functionality of devices 101-101*d*, devices 103-103*d*, and devices 1501, 1601 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A communication device comprising:
a processor; and
a communication interface;
the processor enabled to:
communicate with one or more remote communication devices in a communication session via the communication interface, the communication session configured for exchange of messages between the communication device and the one or more remote communication devices and including output of message text at a user interface of the communication device and at a user interface of the one or more remote communication devices;
receive images from a camera device;
determine that a number of people in the images has changed;
when the number of people increases from a first person to the first person and one or more second persons: automatically transmit an alert to the one or more remote communication devices in the communication session, the alert comprising text indicative that the number of people has increased and respective textual identifiers of the one or more second persons, the alert configured to: cause the one or more remote communication devices to display the text and the respective textual identifiers and automatically enter a privacy mode; and,
when the number of people decreases from the first person and the one or more second persons: transmit, via the communication interface, a second alert to the one or more remote communication devices in the communication session, the second alert comprising respective text indicative that the number of people has decreased.

2. The communication device of claim 1, wherein the processor is further enabled to determine that at least a subset of the images meets a given condition, and the alert is further based on the given condition.

3. The communication device of claim 2, wherein the subset comprises one or more of a change that has occurred in the images and a representation of a face.

4. The communication device of claim 2, wherein the alert is further indicative of the given condition.

5. The communication device of claim 1, further comprising the camera device.

6. The communication device of claim 5, wherein the camera device is located at one or more of a front of the communication device and a rear of the communication device.

7. The communication device of claim 1, wherein the camera device is distinct from the communication device and the processor is further enabled to communicate with the camera device via the communication interface.

8. The communication device of claim 1, wherein the processor is further enabled to communicate with the one or more remote communication devices in a video chat session, different from the communication session, via the communication interface, and wherein the images are acquired by the camera device in the video chat session.

9. The communication device of claim 1, wherein the processor is further enabled to render the images associated with the alert at a display associated with the communication device.

10. The communication device of claim 1, wherein the communication session comprises one or more of a peer-to-peer (P2P) session, text messages, short message service (SMS) messages, and email messages.

11. A method comprising:
communicating, via a processor and communication interface of a communication device, with one or more remote communication devices in a communication session, the communication session configured for exchange of messages between the communication device and the one or more remote communication devices and including output of message text at a user interface of the communication device and at a user interface of the one or more remote communication devices;
receiving, at the processor, images from a camera device;
determining that a number of people in the images has changed;
when the number of people increases from a first person to the first person and one or more second persons: automatically transmitting, via the communication interface, an alert to the one or more remote communication devices in the communication session, the alert comprising text indicative that the number of people has increased and respective textual identifiers of the one or more second persons, the alert configured to: cause the one or more remote communication devices to display the text and the respective textual identifiers and automatically enter a privacy mode; and,
when the number of people decreases from the first person and the one or more second persons: transmitting, via the communication interface, a second alert to the one or more remote communication devices in the communication session, the second alert comprising respective text indicative that the number of people has decreased.

12. The method of claim 11, further comprising determining that at least a subset of the images meets a given condition, wherein the alert is further based on the given condition.

13. The method of claim 12, wherein determining comprises determining whether the subset comprises one or more of a change that has occurred in the images and a representation of a face.

14. The method of claim 12, wherein alert is further indicative of the given condition.

15. The method of claim 11, wherein the method further comprises communicating with the one or more remote communication devices in a video chat session, different from the communication session, via the communication interface, and wherein the images are acquired by the camera device in the video chat session.

16. The method of claim 11, further comprising rendering the images associated with the alert at a display associated with the communication device.

17. The method of claim 11, wherein the communication session comprises one or more of a peer-to-peer (P2P) session, text messages, short message service (SMS) messages, and email messages.

18. A non-transitory computer program product comprising a computer usable medium having a computer readable program code adapted to be executed to implement a method of:
communicating, via a processor and communication interface of a communication device, with one or more remote communication devices in a communication session, the communication session configured for exchange of messages between the communication device and the one or more remote communication devices and including output of message text at a user interface of the communication device and at a user interface of the one or more remote communication devices;
receiving, at the processor, images from a camera device;
determining that a number of people in the images has changed;
when the number of people increases from a first person to the first person and one or more second persons: automatically transmitting, via the communication interface, an alert to the one or more remote communication devices in the communication session, the alert comprising text indicative that the number of people has increased and respective textual identifiers of the one or more second persons, the alert configured to: cause the one or more remote communication devices to display the text and the respective textual identifiers and automatically enter a privacy mode; and,
when the number of people decreases from the first person and the one or more second persons: transmitting, via the communication interface, a second alert to the one or more remote communication devices in the communication session, the second alert comprising respective text indicative that the number of people has decreased.

* * * * *

UNITED STATES PATENT AND TRADEMARK OFFICE
CERTIFICATE OF CORRECTION

PATENT NO.        : 9,294,718 B2
APPLICATION NO.   : 13/341156
DATED             : March 22, 2016
INVENTOR(S)       : James Allen Hymel et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 657 days.

Signed and Sealed this
Second Day of August, 2016

Michelle K. Lee
*Director of the United States Patent and Trademark Office*